(12) United States Patent
Braghiroli et al.

(10) Patent No.: US 7,792,610 B2
(45) Date of Patent: Sep. 7, 2010

(54) WHEEL BALANCING APPARATUS AND METHOD WITH IMPROVED HIDDEN SPOKES PLACEMENT FOR IRREGULAR WHEELS

(75) Inventors: Francesco Braghiroli, Reggio Emilia (IT); Marco Tralli, Portile (IT); Simona Cultrera, Reggio Emilia (IT)

(73) Assignee: Snap-On Equipment Srl A Unico Socio, Correggio (IT)

( * ) Notice: Subject to any disclaimer, the term of this patent is extended or adjusted under 35 U.S.C. 154(b) by 645 days.

(21) Appl. No.: 11/655,870

(22) Filed: Jan. 22, 2007

(65) Prior Publication Data

US 2007/0186651 A1 Aug. 16, 2007

(30) Foreign Application Priority Data

Jan. 27, 2006 (EP) .................................. 06001730

(51) Int. Cl.
*G05M 1/38* (2006.01)
*G01M 1/16* (2006.01)
(52) U.S. Cl. ........................................ 700/279; 73/462
(58) Field of Classification Search ................. 700/279; 382/100; 73/462
See application file for complete search history.

(56) References Cited

U.S. PATENT DOCUMENTS

| 5,537,669 | A | * | 7/1996 | Evans et al. .................. 382/141 |
| 6,122,957 | A | * | 9/2000 | Bux et al. ....................... 73/66 |
| 6,484,574 | B1 | * | 11/2002 | Douglas et al. ................ 73/462 |
| 6,535,281 | B2 | * | 3/2003 | Conheady et al. ...... 356/139.09 |
| 6,757,407 | B2 | * | 6/2004 | Bruckstein et al. .......... 382/100 |
| 6,983,656 | B2 | * | 1/2006 | Cullum et al. ................ 73/487 |
| 7,362,911 | B1 | * | 4/2008 | Frank .......................... 382/260 |
| 2002/0018218 | A1 | * | 2/2002 | Conheady et al. ........... 356/602 |
| 2002/0164048 | A1 | * | 11/2002 | Bruckstein et al. .......... 382/100 |

FOREIGN PATENT DOCUMENTS

DE 44 15 931 A1 11/1995
EP 0 681 170 B1 11/1995

* cited by examiner

*Primary Examiner*—Ryan A Jarrett
*Assistant Examiner*—Sivalingam Sivanesan
(74) *Attorney, Agent, or Firm*—McDermott Will & Emery LLP

(57) ABSTRACT

A method and an apparatus for carrying out the method are disclosed for hidden spokes placement of balancing weights on a wheel, having a hub, a rim and the hub and the rim being connected by several spokes, comprising determination of spoke configuration data. Now, it is possible to analyze spoke configuration and width of the spokes in details, enabling the weight splitting behind spokes even if spokes are forked, oblique, not equidistant, or they have different dimension.

18 Claims, 14 Drawing Sheets

WHEEL BALANCING APPARATUS AND METHOD WITH IMPROVED HIDDEN SPOKES PLACEMENT FOR IRREGULAR WHEELS

The present invention relates to a method for hidden spokes placement of balancing weights on a wheel, having a hub, a rim and the hub and the rim being connected by several spokes according to claim 1, and an apparatus for balancing a vehicle wheel and placing required balancing weights behind spokes of a wheel to be balanced according to claim 16.

BACKGROUND OF THE INVENTION

First of all, to avoid misunderstandings, for the present application following prescribed terminology shall be used in connection with technical terms of a vehicle wheel. With reference to FIG. 1, the whole object shall be understood as wheel 100, which can be made of an applicable material alike an aluminum alloy. The part of the wheel 100 on which a tire (not shown) is to be mounted shall be understood as the rim 110 and the edges of the rim 110 preventing a tire from getting off the rim 110 is known as the bead 115 of the rim. The middle of the wheel 100, where it normally is mounted to a vehicle is called the hub 105 of the wheel 100, the elements connecting the hub 105 and the rim 110 are so-called spokes 120. The area where the spokes 120 merge the rim 110 is herein considered as the base 125 of a spoke 120. In this context a vehicle may be a motor driven vehicle, a motorcycle, a car, a truck, or even an airplane the landing gear of which also comprises wheels. In other words, any kind of object with turning wheels, the wheels of which may be subject to the method or apparatus of the present application.

Wheels for vehicles require balancing to counter unbalances. So-called Hidden Spokes Placement (HSP) requires the balancing weight(s) to be hidden behind the spokes of a wheel such that the weight(s) are nearly not visible. The principle idea of hidden spokes placement is disclosed, for instance, in the publication of application DE 44 15 931 A1. As an example, FIG. 1 illustrates a design aluminum alloy wheel 100 having five equidistant spokes 120 with equal width. The optimal location under consideration of design requirements for a balancing weight 102 is depicted as behind a spoke 121 (the weight depicted as small box is marked by an arrow).

To automatize HSP, implementation of several functions in a wheel balancing apparatus is required. These functions comprise, for instance, measuring the unbalance of the wheel and calculation of the required optimal balancing weight(s). Further, determination of the spoke locations of the wheel and if necessary, calculation of the required split weights for hidden placement. These functions may be implemented in software where respective algorithms performing the required methods steps.

In particular, for HSP it is crucial that the wheel balancing apparatus, that is the control unit thereof, knows about the correct and exact positions and shape of the spokes of the vehicle wheel to be balanced. For that purpose, the wheel may be scanned in order to gather information about the spoke configuration of the wheel such as inter alia position of the spokes and width of the spokes.

U.S. Pat. No. 6,535,281 discloses a method and an apparatus for scanning a vehicle wheel, wherein a location on the wheel is sensed by means of a light beam emitted by a light source and is reflected to a position-sensitive receiver. The spacing of the sensed location relative to a reference location is measured from the directions of the emitted beam and the reflected beam. The light source and the position-sensitive receiver are synchronously pivoted about a common axis by means of a rotary drive including a stepping motor for successive measurement steps. A rotary angle sensor supplies signals proportional to the rotary position of the stepping motor to an evaluation system. By this method and apparatus it is possible to provide digitized scan data on the spoke configuration of the wheel to be balanced. That information is represented by the measured spacing of each sensed location relative to the respective reference location on the wheel.

However, to ensure efficient throughput of a wheel balancing apparatus the scan data should be reduced to a minimum as well as the elaboration thereof. Further, the elaboration of the scan data should be on the one hand as swift as possible and again be as reliable as possible.

However, modern wheels, in particular expensive wheels made of aluminum alloys, come in a great variety of spoke configurations. In other words, it is unlikely that all spokes have equal distances from each other. Even it is not a matter of fact that all spokes of a wheel have same width, as can be seen from FIG. 2a to 2g.

In FIG. 2a, the spoke configuration of wheel 200a comprises a rim 210a with five equidistant pairs 230a of spokes 220a, wherein a pair 230a of spokes 220a has two equidistant spokes 220a with equal width. In FIG. 2b the wheel 200b comprises a rim 210b with oblique spokes 220b, wherein the spoke corresponds not to the shortest direct connection between the hub and the point on the rim where the base of the spoke is located. In FIG. 2c the spokes 220c of the wheel 200c form five equidistant pairs 230c, wherein the spokes 220c of a certain pair 230c have different dimensions alike different width. FIG. 2d shows a wheel 200d with bifurcate spokes 220d, wherein a certain spoke 220d runs form the hub 205d in direction of the rim 210d and before the spoke 220d reaches the rim 210d it branches in two spokes 221d, 222d. In FIG. 2e, the spoke configuration of wheel 200e comprises a rim 210e with five equidistant pairs 230e of spokes 220e, wherein a pair 230e of spokes 220e comprises two symmetrical spokes 220e, and wherein spaces 240e between the pairs of spokes 230e are formed like circles and spaces 241e within a pair of spokes 230e are formed as a slot. The wheel 200f in FIG. 2f comprises five groups 231f of spokes 220f, wherein two spokes of a group 231f are thin and one spoke is relatively broad. On the other hand, the spaces 240f of the wheel 200f are nearly equal and equidistant distributed. The wheel 200g in FIG. 2g is somewhat a hardening version of the wheel 100 of FIG. 1. The wheel 200g on the first glance looks easy to handle, however the small space 241g in the base of the spokes 220g are troublesome for HSP.

It is therefore an object of the present invention to provide a method and an apparatus for balancing wheels enabling automatized hidden spokes placement of balancing weights, whereby it is possible to handle as much as possible of the different kinds of spoke configurations as shortly discussed above.

SUMMARY OF THE INVENTION

According to a first aspect, a method for hidden spokes placement of balancing weights on a wheel having a hub, a rim and the hub and the rim being connected by several spokes, comprises determination of spoke configuration data with steps according to claim 1.

According to a second aspect, an apparatus for balancing a vehicle wheel and placing required balancing weight behind spokes of a wheel to be balanced comprises features according to claim 16.

According to the first aspect, a method for hidden spokes placement of balancing weights on a wheel having a hub, a rim and the hub and the rim being connected by several spokes, comprises determination of spoke configuration data by the steps of: sampling of spokes data at a fixed distance from the rim; transforming the spokes data from spatial domain into frequency domain providing frequency characteristics of the scanned spokes data; and deriving the spoke configuration data from the frequency characteristics and the spokes data. It has been found that the frequencies representing the scanned/sampled spokes data in the frequency domain allow determination of a first guess for the number of spokes as well as the position thereof related to a predetermined reference point.

Additionally it is possible to perform the sampling step at different positions having predetermined distances relative to the bead of the rim. By this feature it is possible to collect spokes data at different distances to the rim such that it is possible to conclude from the relations between the different spokes data collected in different positions on the spoke configuration.

Further the sampling step may comprise evaluating each data point of the sampled spokes data by assigning a predetermined value representing one of a predetermined condition. By this kind of weighting the collected spokes data, the evaluation of the spokes data, in particular the analysis in the frequency domain is enhanced.

Furthermore, the sampling step can be improved by revolving of the wheel for several revolutions in each sampling position, wherein in each revolution the sampled spokes data is completed at positions where reliable sample values are still missing. Thus, by collecting a more complete ensemble in each scanning position the reliability of the collected spokes data is enhanced.

In one embodiment the transforming step comprises performing of a Fourier Transform on the scan data providing Fourier data of the spokes data. Preferably a Fast Fourier Transform (FFT) is used which can be implemented in software or digital hardware such as a digital signal processor. Hence, it is possible to have a fast processing of the spoke scan data.

In a further development the deriving step comprises identifying periodical patterns as corresponding to spoke groups by a harmonic frequency information of the Fourier data having highest amplitude and position of the periodical groups by a phase information of the harmonic frequency. Nearly all wheels comprise symmetrical groups of spokes and the periodical pattern thereof can be recognized by the harmonic frequency, with the highest amplitude, of the transformed spokes data. Hence, positions of spokes can be deducted and respective spoke widths can be derived in the identified periodical patterns of the spoke data and frequency characteristics thereof. Moreover, the spoke configuration data may be stored as a map representing the spoke configuration data of the wheel. This spoke configuration map can be used as reference for the consecutive hidden spokes placement (HSP) of necessary balancing weights.

Accordingly, there is firstly a step of determining an optimal value and optimal position of a balancing weight for the wheel to be balanced. Then, there may be a step of comparing the determined optimal position of the balancing weight with the spoke configuration map/data whether the optimal position of the balancing weight already matches with a position of a spoke. Hence, by comparing the optimal position of the balancing weight and the spoke configuration data, it is possible to determine whether the optimal position is already behind a spoke or not. In case yes, the weight can be placed immediately at the optimal balancing position. However, if the optimal position is not or partially not behind a spoke such that the weight would be visible, there may be additionally step, in which a first and a second spoke in the spoke configuration map/data are found, which are adjacent to the optimal position of the balancing weight.

Accordingly, a further development may comprises a step of determining a first and a second spoke in the spoke configuration data adjacent to the optimal position of the balancing weight, if the outcome of the comparing step is such that the determined optimal position of the balancing weight is not or partially not behind a spoke.

Furthermore, all embodiments may comprise a splitting step with calculating a first and second split value for a first and second, respectively, split balancing weight based on the determined value and position of the optimal balancing weight and the positions of the first spoke and the second spoke.

In a further development, this splitting step may be performed in an iterated manner (or as a loop) until a predetermined condition (or HSP-quality requirement) is met. Such conditions can be whether a predetermined (maximum) dimension for a split balancing weight is achieved. That is, it is checked whether the calculated dimension for a balancing weight is smaller than a predetermined limit. Another condition may be whether the determined dimension for a split balancing weight is smaller as a width of a respective determined spoke according to the spoke configuration map/data. That is, the dimension is assessed dependently on the respective spoke where a certain balancing weight shall actual be placed behind. As a result, it is possible to iterate the splitting of the balancing weight(s) to obtain smaller pieces of weight, which can be easier hided behind spokes. Thus, after a first splitting step, the first spoke and the second spoke may become new points of departure to repeat the procedure of balancing weight splitting. Hence, also in wheels having a lot of thin spokes HSP with good results is possible.

Each iteration of the (balancing weight) splitting step may be initialized by the step of setting at least one of the determined positions of the first spoke and the second spoke with the respective calculated value for the split balancing weight as respective new starting conditions for a next splitting step. In other words, there can be cases where only one of two split balancing weights is to be split by additional splitting steps, but it is also possible that both split balancing weight have to be split again due to not meeting the set HSP-quality requirements.

The methods of the present invention can be implemented as a computer program product comprising code means for carrying out the steps of one of the methods of invention, when the code means run on a computer controlling a respective equipped wheel balancing apparatus. Further, the computer program product may be stored on a data storage means, which can be read by a respective computer such that the code means are loaded into the computer to be run on the computer.

According to a second aspect, an apparatus for balancing a vehicle wheel and placing required balancing weight behind spokes of a wheel to be balanced, comprises a measurement shaft attached to a balancing machine; mounting means for mounting the vehicle wheel to the shaft for rotation about a wheel axis; a light source operable to direct an emitted light beam onto a location on the vehicle wheel; a light-sensitive receiver operable to receive a beam reflected by the sensed location on the vehicle wheel; means for moving the light source and the receiver synchronously; means for storing measurement values of the position sensitive receiver; transformation means for performing a transformation on the stored measurement values from the spatial domain into the frequency domain; and an electronic evaluation system configured to evaluate the transformed spokes data and generating spoke configuration data representing the positions and characteristics of the spokes and the spaces between consecutive spokes of the wheel.

In a further development, the apparatus further comprises a force measuring device operable to supply signals proportional to an unbalance of the vehicle wheel to the evaluation system; and wherein the evaluation system is configured to evaluate the values for balancing the vehicle wheel and the values of the spoke configuration data for providing positions for balancing weights which are on the rim behind a spoke of the wheel.

The apparatus may be provided with the light source and the receiver being synchronously moveable for scanning spokes data in several predetermined positions.

The transformation means can be implemented as a processing unit configured to perform a Fourier Transform. Moreover, the transformation means may be a digital signal processor, which is configured to perform a Fast Fourier Transform.

BRIEF DESCRIPTION OF THE DRAWINGS

Other objects and features will become apparent from the following detailed description considered in conjunction with the accompanying drawings. It is to be understood, however, that the drawings are designed solely for purposes of illustration and not as a definition of the limits of the invention, for which reference should be made to the appended claims only. It should be further understood that the drawings are merely intended to conceptually illustrate the structures and procedures described herein.

DESCRIPTION OF THE EMBODIMENTS

Figure 1:
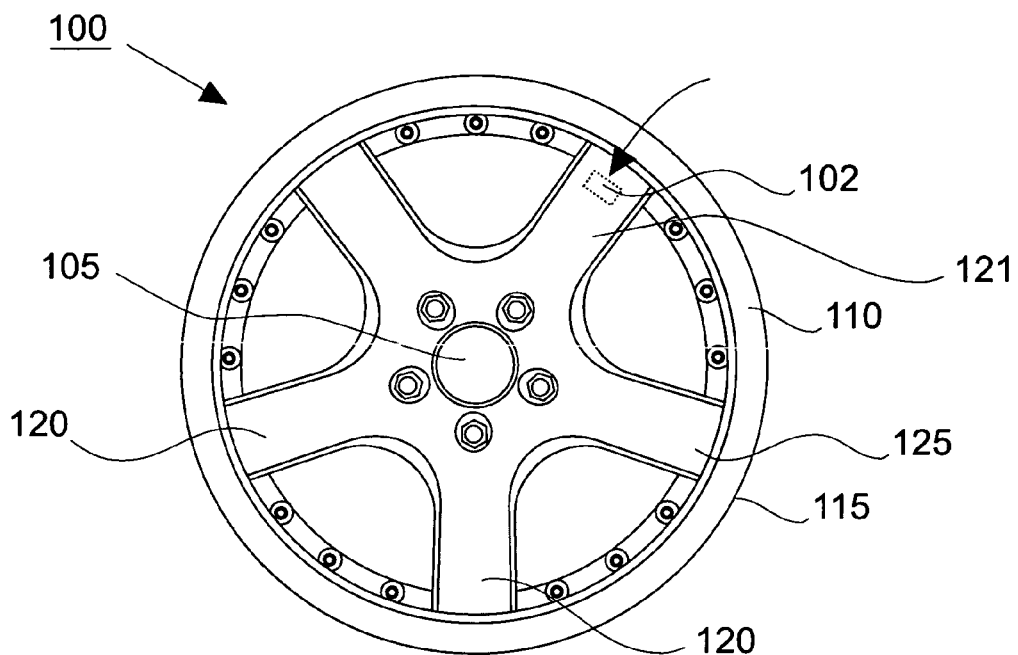
FIG. 1 shows an example for a vehicle wheel with five equidistant spokes, wherein on optimal hidden spokes placement of a balancing weight is depicted.

According to a first embodiment, the scanner of a wheel balancing apparatus focuses on the rim of a vehicle wheel, at one position, for instance 35 mm, over the bead of the rim. If this is not possible, the scanner may focus on a position at, for instance, $2/3$ of the radius of the rim. Then, while the rim is running for one complete revolution, the scanner samples the wheel. That is the distance from scanner to the point of the rim, where the sensor of the scanner is directed to, is repeatedly read.

The read distances are sampled with a predetermined resolution. It is known, that resolution of digitized data can be defined by a predetermined number of quantization steps for the storing the read/sampled distance, that is the scanned spokes data. The scanned spokes data may be stored in a memory of a control unit or respective computer environment for control of the balancing apparatus.

If a resolution of 256 steps for each vector of spokes data is used, every step corresponds to $360°/360=1.4°$ of the rim circumference. That is detection precision is lowered when rim diameter is increased. For example, the resolution of $1.4°$ corresponds to 6.2 mm on the circumference of a rim, the diameter of which is 50 cm (20 inch). The following table presents values of circumference arc (referring to a resolution of $1.4°$) for different diameter rims:

| rim diameter (inch) | circumference arc (mm) |
|---|---|
| 14 | 4.3 |
| 15 | 4.7 |
| 16 | 5.0 |
| 17 | 5.3 |
| 18 | 5.6 |
| 19 | 5.9 |
| 20 | 6.2 |

Accordingly, in spokes detection, an error has to be accepted, which is at least related to the middle point of spoke as wide as the circumference arc related to the diameter of the rim. However, since it is very difficult, at all, to hide weights behind spokes if there are many of very thin spokes, this problem can be neglected.

As to the sampling of the spokes data, since it is possible that signals given from scanner are saturated or noisy. According to a further development, by using more than one revolution during sampling of the spokes data, gaps in previous revolutions in the collected spokes data can be filled by useful sample values in the scanned spokes data.

The scanned spokes data, which corresponds to data in the spatial domain, is transformed into the frequency domain for further analysis. For instance, a Fourier Transform implemented in software or a respective digital signal processor configured as Fourier Transform, calculates on the collected spokes data the respective frequency information representing the scanned spokes data in the frequency domain. A Fast Fourier Transform (FFT) may also be used for implementation of the Fourier Transform. Then, the highest harmonic in the frequency data is searched, that is the harmonic with the maximum amplitude. In this embodiment of the invention, the index of this harmonic is taken as the number of spokes in the rim. The phase of this harmonic provides the position of one spoke and consequently, in case all spokes are equidistant implicitly all positions of all other spokes are known.

Figure 2A:
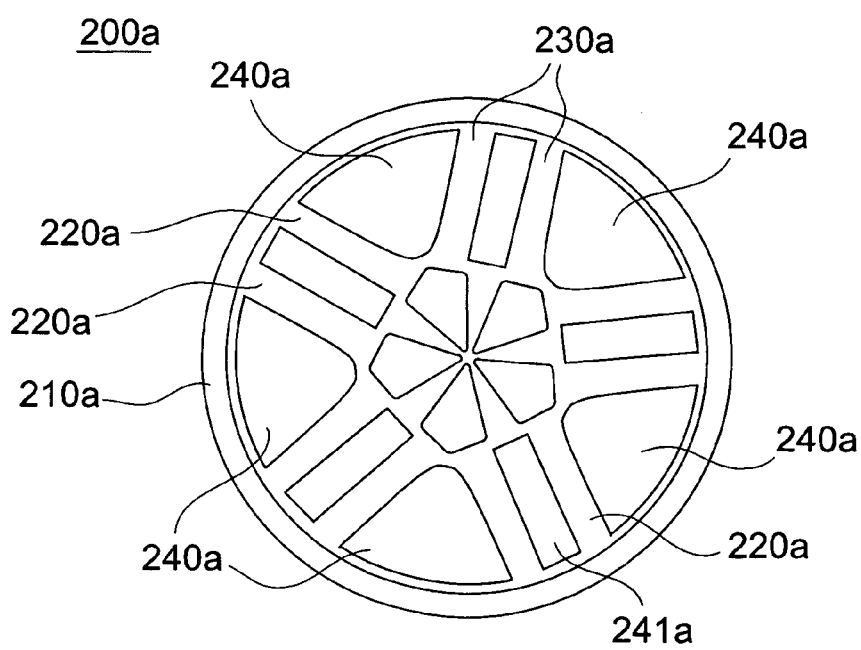
FIG. 2a-2g shows several examples for vehicle wheels with spoke configurations, where automatized determination of the spoke locations can be susceptible for errors.

Now reference is made to the kind of wheels, which are hard to handle. The first class of wheels has not equidistant spokes, as shown in FIGS. 2a, 2c and 2e. Here the Fourier Transform doesn't exactly count the spokes, but equidistant groups of spokes or periodical patterns of spokes, respectively. In the examples of FIG. 2a, the harmonic with the highest amplitude would lead erroneously to 5 spokes as a result and not 10 as correct. This problem is caused using the Fourier Transform without further considerations.

In other words, the frequency characteristic of the sampled spokes data provides the possibility to find periodical elements in a given interval. Also, when at a given wheel spokes are not equidistant, for example because there are equidistant pairs of spokes as in FIGS. 2a, 2c and 2e, the mere interpretation of the frequency characteristics fails. As a result, the position decided for weight placement could be in the space between two spokes of the same pair as depicted in FIGS. 3a and 3b. As a result, the weight is not hidden behind one spoke.

Figure 2B:
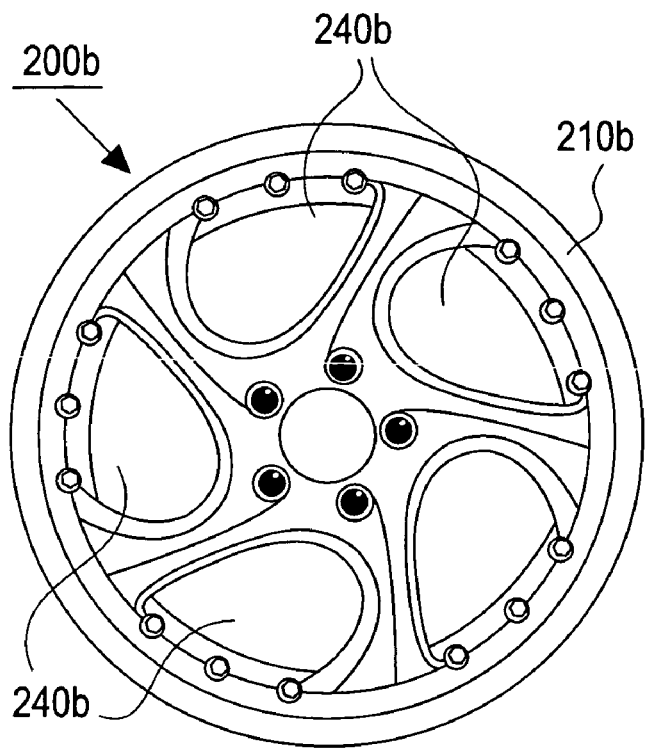
Figure 2C:
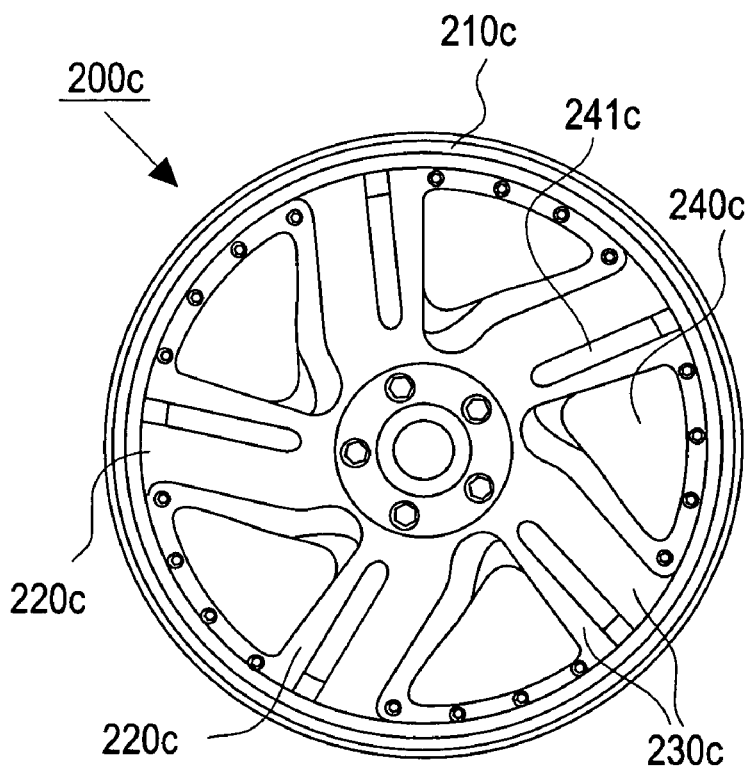
Figure 3A:
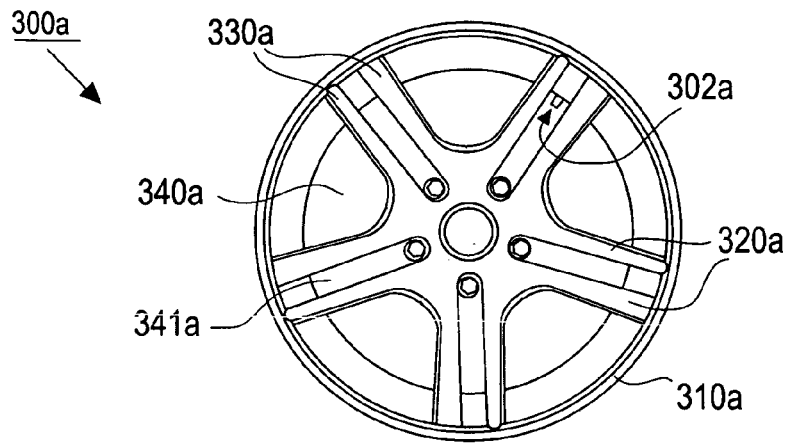
FIG. 3a-3b shows examples for bad placement of balancing weights due to wrong interpretation of sampled spokes data.
Figure 3B:
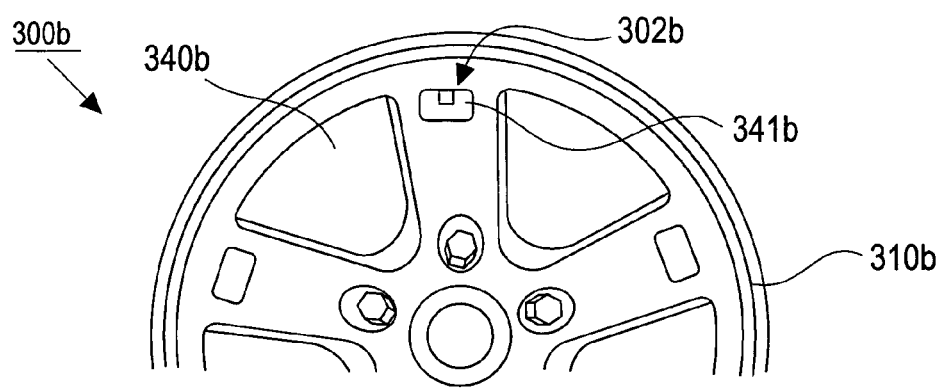
Figure 4:
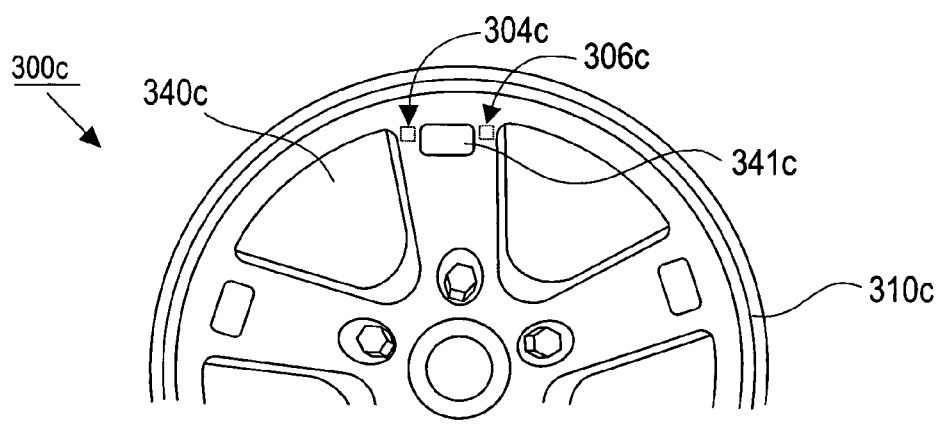
FIG. 4 illustrates in more detail hidden spokes placement by means of the present invention such that sampled spokes data is interpreted correct and the balancing weight of FIG. 3b is split in two hidden placed balancing weights.

The second class of wheels has spokes not straight but oblique as illustrated, for example, in FIGS. 2b and 2c. Here, when the point of weight placement behind the spoke is based on the phase of the identified harmonic in the Fourier transformed scanned spokes data, the procedure calculates the medium point of the segment of spoke where the scanner focuses on. However, the calculated point is extrapolated or projected, respectively, on the spoke base, and it is supposed that the medium point of the spoke base is so derived. However, when the spokes of the rim on focus are not perfectly straight as in FIGS. 2b and 2c, the estimated spoke base will not be the true medium point of the spoke base, since this base is shifted with respect to the zone where the scanner has been focused on. As a result, if a weight is placed considering as reference the estimated/calculated medium point, it may be visible from one side of the spoke, because the calculated spoke base is not the true medium point of spoke base.

Figure 2D:
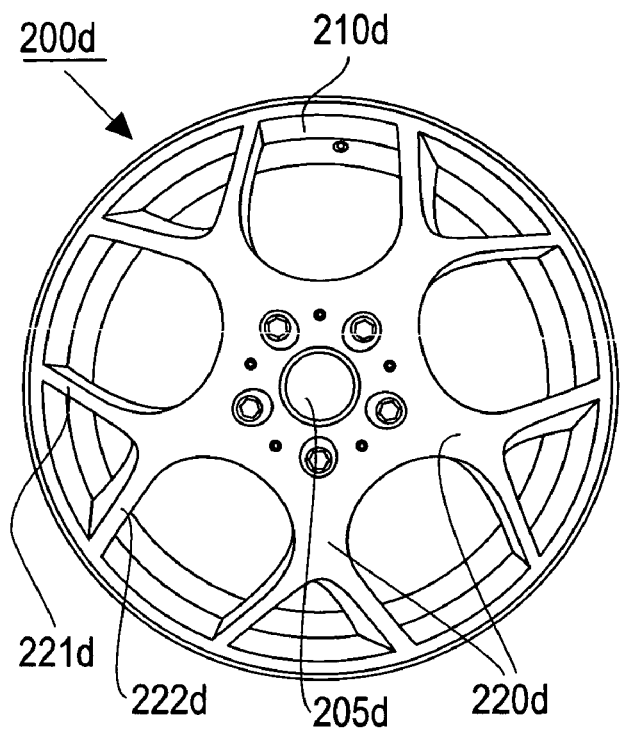
Figure 2E:
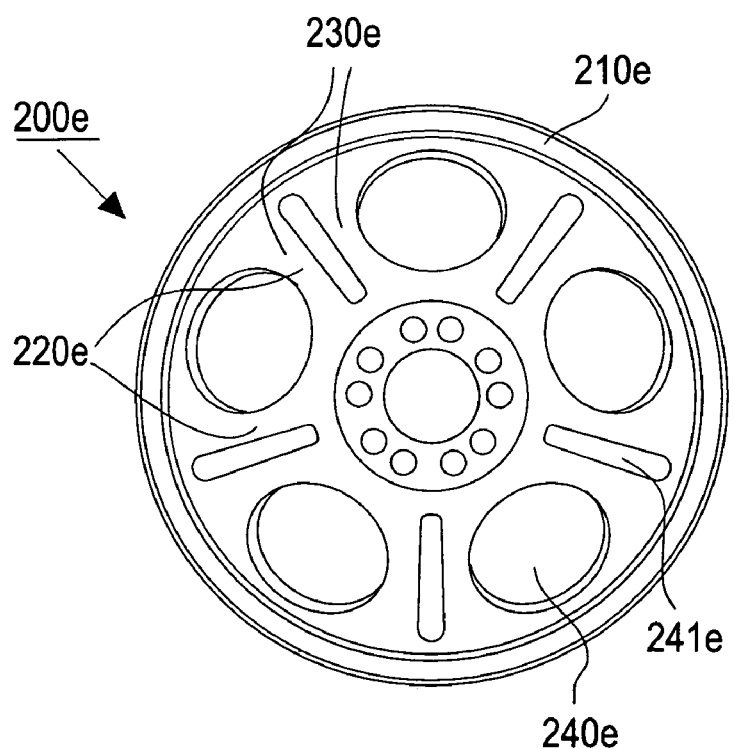
Figure 2G:
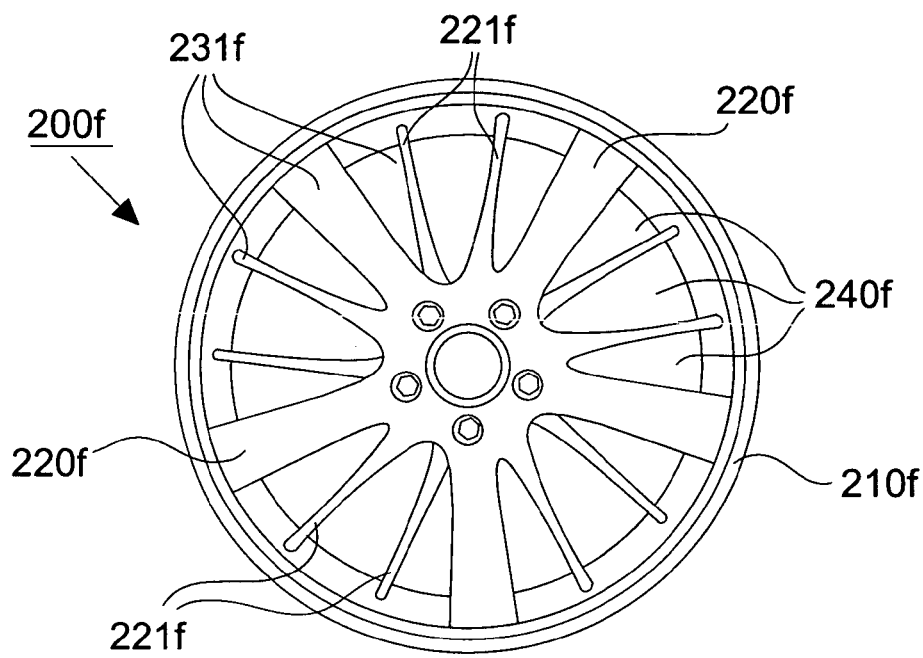
Figure 2F:
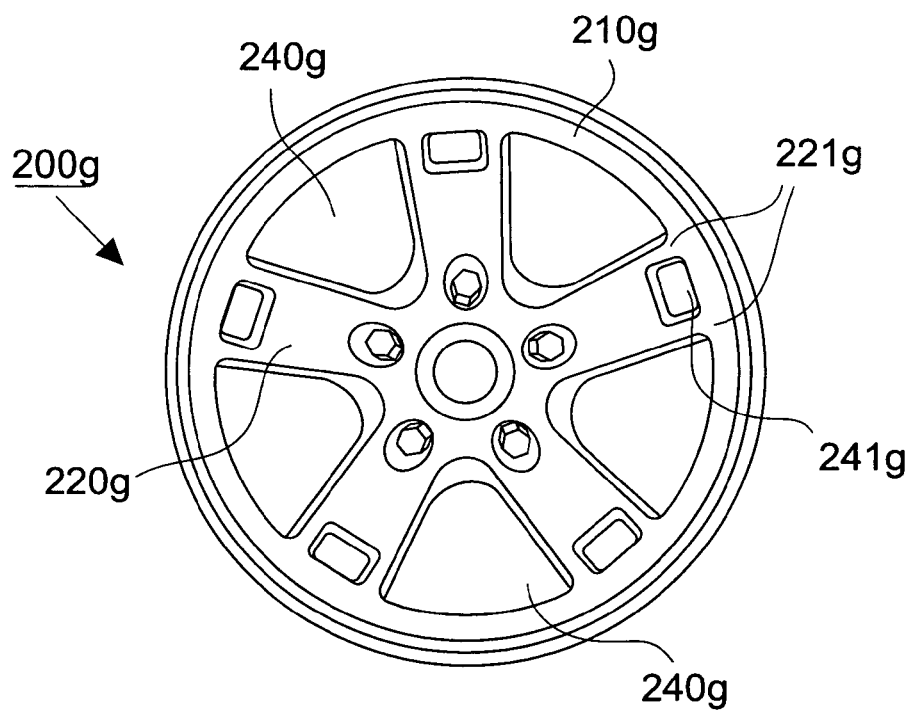

The third class of wheels has different dimensions spokes as shown in FIGS. 2c and 2f, if it is supposed that spokes in one rim have the same width, the calculated and thus estimated point from the Fourier Transform is considered as the medium point of the spoke base. That is the spoke width is an important factor.

To sum it up, merely using the harmonic with the highest amplitude of the transformed spokes data and the phase information does not always lead to corrected results. This is the case, in particular if the spokes have different values of width, either if the spokes are perfectly equidistant from each others (for example FIG. 2f), or if not but pairs of spokes are equidistant (for example FIG. 2c).

As described above, analysis of the Fourier transformed spokes data gives back corrected results only for periodical spoke patterns, which are pairs or groups of spokes, being perfectly equal. However, it is noted that it is necessary to know the width and position of a certain spoke, in order to establish completely hiding the balancing weight behind that spoke.

Further there is the class of so-called forked spokes as illustrated in FIGS. 2d and 2g, where spokes divide themselves in two or more branches, from the upper part of a spoke in direction to the spoke base. If the zone or position, respectively, on which the scanner focuses while sampling the spokes data takes place in the part of the spoke where it is unique and not already divided, then the harmonic analysis of the frequency characteristics of the spokes data cannot count correctly the spokes. In worst scenario, the determined point for weight placement could be exactly between two spoke branches. Consequently, the balancing weight is not hidden behind a spoke but visible between one spoke branch and the other. To work efficiently, the sampling of spokes data and the analysis of the frequency characteristics of thereof should be performed near the rim base.

A further development provides also a solution for the afore-discussed cases. The principle additional features comprise lowering the point where scanner focuses on or adding further sampled spokes data at different scanning positions, calculation width of every spoke, and turning of the rim for more than two revolutions for sampling the spokes data.

As to the scanner position(s), for handling the forked spokes (FIGS. 2d and 2g) or the oblique spokes (FIGS. 2b and 2c), it may be sufficient to lower the observation or scanning, respectively, point of the scanner with respect to a fixed point/position as in the principle embodiment (the example above was 35 mm above the bead of the rim) towards a point/position closer to the spoke base; for example, 20 mm above the bead of the rim. However, there is some risk that this position is already too low and the rim is not yet divided in spokes. In other words, the scanned spokes data would not detect any spokes, at all.

In one further development, the scanner for sampling the spokes data focuses on more than one position, for instance, in two or three positions, away from rim contour towards the hub along the radius of the wheel. This provides a good trade off between the efforts for collecting and analysis of the spokes data and the achieved results.

Because of the most significant data is that about positions closer to the rim contour (near the base of the spokes), the harmonic analysis of the frequency characteristics of the spokes data can be limited to collected data about the first position and, if necessary, other data is studied only after.

As to the spoke width, since the spokes data read from the scanner is memorized, for instance, as a data vector (in the following also called vector for short). In a further development this vector is used to identify the width of every spoke. Additionally, for that purpose, in one embodiment the measured distances, that is the spokes data, is sampled such that the data has a more unambiguous meaning. The values written in the vector at a certain position (in the following the index i is used to identify a certain position) can, for instance, be stored as follows:

0 for a not collected value (the vectors may be initialized with null values);
1 to point an empty space between two consecutive spokes;
2 for a noisy signal;
3 for a signal saturated in light (it points that laser has hit a spoke); and
4 to point the presence of a spoke.

For identification the spoke width, in one embodiment in the vector consecutive elements equal to 0, 2, 3 or 4 are counted. That is vector elements with a value equal to 1 are not considered because that value points an empty space. In turn, for identification the width of a space between two adjacent or consecutive, respectively, spokes, the consecutive elements equal to 0, 1 or 2 are counted. In this way it is possible to correctly operate in case of different dimensions spokes as well as cases of not equidistant spokes.

Additionally, it has found that there is a trade off with respect to the used number of rim revolutions for sampling the spokes data. More revolutions will lower the number of elements in the vector equal to 0 and 2, which symbolize open cases, that is do not carry useful information. In one embodiment, turning the rim in four revolutions.

Accordingly, about a revolution of the rim, assumed the machine turns at 60 RPM (round per minute), it takes 1 second to make a complete revolution. Further, when spokes data is collected in three different positions at the wheel, the scanner is moved, for instance, to the following three scanning positions:

scanning position 1: 50 mm above the bead of the rim,
scanning position 2: 35 mm above the bead of the rim, and
scanning position 3: 20 mm above the bead of the rim.

Scanning position 2 is the single scanner position according to the basic solution. It is worth noting that the aforementioned distances 20 mm, 35 mm, and 50 mm are not to be considered as limiting the principle to those values, but good results have been reached by these settings. Further, instead of moving one scanner into the three different scanning positions, also three separate scanners may be used.

If four rim revolutions are used, in every position, the time for spokes data capturing raises compared to the basic solution, but as profit more accurate and detailed information is available to help the analysis on the spoke configuration. That is about 2 seconds are necessary for data capturing, 1 second to make a complete revolution, and about 1 second for an accurate scanner placement. Moving the scanner in three different positions and executing four revolutions in every position, the scanning of the spokes data takes about 12 seconds.

The collected three vectors of spokes data may be saved in a spokes data matrix, represented, for instance, as spokes_data[3][256]. That is one single row relates to one of the three position of the scanner (20 mm, 35 mm, 50 mm). The following table illustrates the data structure, which may be used for storing the scanned spokes data:

|       | 0 | 1 | ... | ... | 254 | 255 |   |
|-------|---|---|-----|-----|-----|-----|---|
| 50 mm | ... | ... | ... | ... | ... | ... | → spokes_data[0] [256] |
| 35 mm | ... | ... | ... | ... | ... | ... | → spokes_data[1] [256] |
| 20 mm | ... | ... | ... | ... | ... | ... | → spokes_data[2] [256] |

Then, the three rows of the spokes data matrix can be managed as single vector and can be distinctly processed through the Fourier Transform, to recognize possible periodical groups. As discussed above, a periodical group may, for example, be in the simple case one spoke between two empty spaces, or in trickier cases a pair of spokes together with a triple of empty spaces, or a triple of spokes and four empty spaces, and so on. The above-described FFT processing on every vector returns the number of detected periodical groups and the position of one of each periodical group. Therefore, a first vector, for example the vector spokes_data[2][256], is chosen to be analyzed.

In a further development, at first, particular conditions are assessed, which may indicate that the vector could be unusable. It may be verified that the number of elements with value equal to 1 is enough. For instance, if the vector does not contain elements suggesting a space presence, it could be that the scanner position is too low. That is the scanning takes place on the rim below the bases of the spokes. Further, it may be verified that the number of elements with value equal to 3 or 4 is enough too. For instance, if the vector is full of elements equal to 2 or 0, the vector is considered as undetermined. If one of such plausibility conditions is not verified, it can be concluded that it is not possible to identify periodical groups in the vector, so the vector at the next position is chosen to be analyzed. In case that none of the vectors is considered as valid the procedure ends.

A next check may be to verify that the spoke width is enough to hide balancing weight behind the spokes. For that purpose, the mean of spokes width is calculated and it is verified that the mean is larger than a predetermined threshold. As another plausibility check, at least half amount of spokes should have a width larger than the predetermined threshold. In case that one of those two conditions is not verified, it is possible to count the spokes, but it is senseless to hide balancing weights behind one so thin spoke.

Then a further plausibility check is to verify that the calculated number of periodical groups is equal in all three vectors. If this is not the case, this can be taken as strong indication that spokes are forked. In presence of this kind of spokes, the number of periodical groups must be the minor number and further, the minor number must be an integer divisor of the major number, in relation to the number of branches (for example, if spokes are bifurcate, the minor number is exactly half of the major number). In other words, the number of periodical groups in one vector at the higher position is related/compared to that one of the examined vector in a lower position (lower position means nearer to the base of the spoke). In other words, the invention is not limited to handle spokes that divide themselves in two branches, the principle of the invention remains useable even with spokes that divide themselves in more branches, not only in two branches as with bifurcate spokes.

After determination of the vector to analyze and the proper number of periodical groups, the periodical groups in the vector have to be defined. Then, the collected spokes data values can be interpreted to set spoke width and spaces width. In one embodiment, a detailed map of spoke position and space position in each periodical group is set up. Each periodical group is linked to a certain position at the rim of the wheel by the phase of the selected harmonic, which is calculated by the transformation from the spatial domain into the frequency domain, for instance, the Fourier Transform.

Figure 6A:
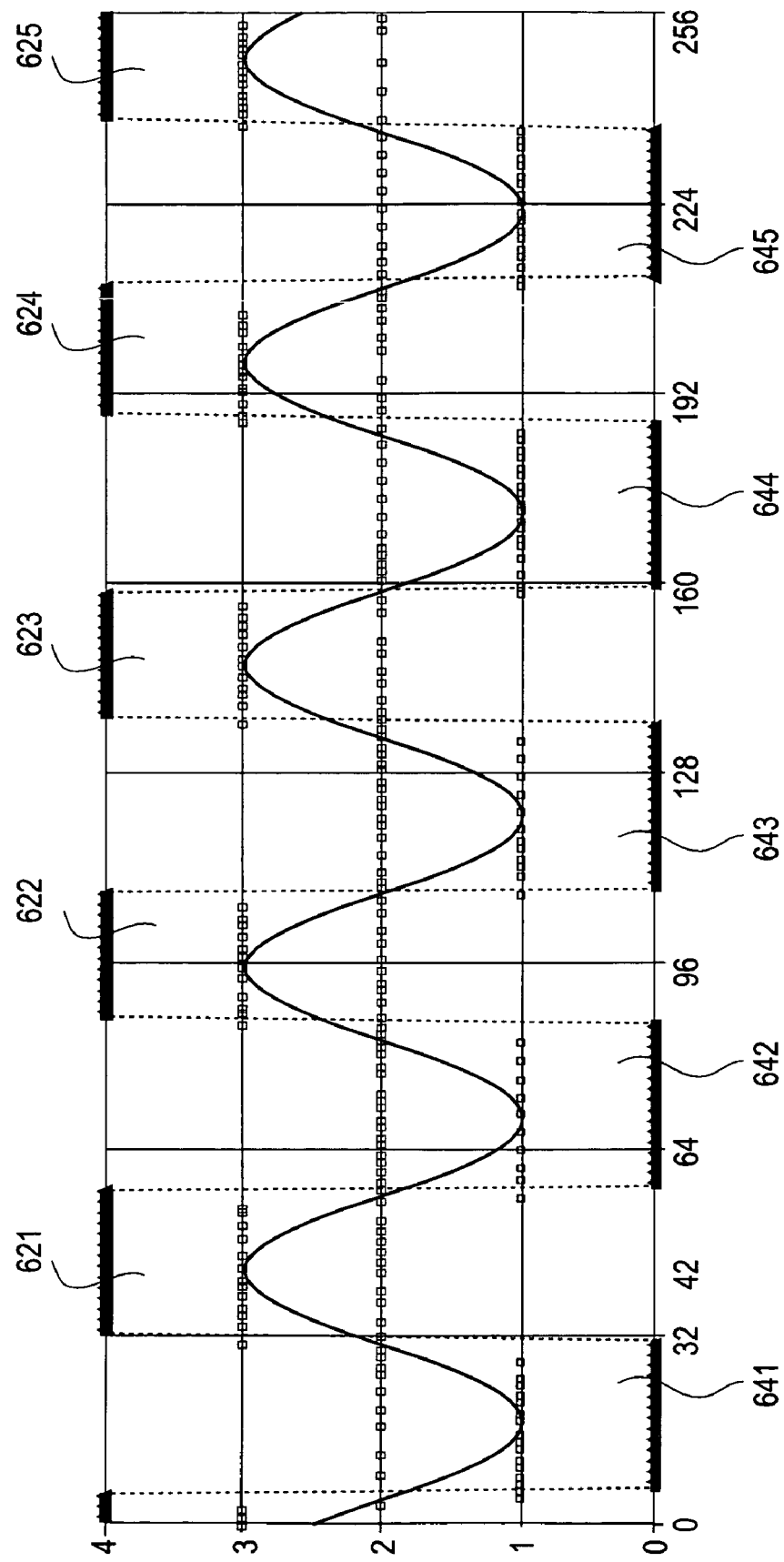
FIG. 6a shows identification of five equidistant spokes in the sampled spokes data of FIG. 5.
Figure 6B:
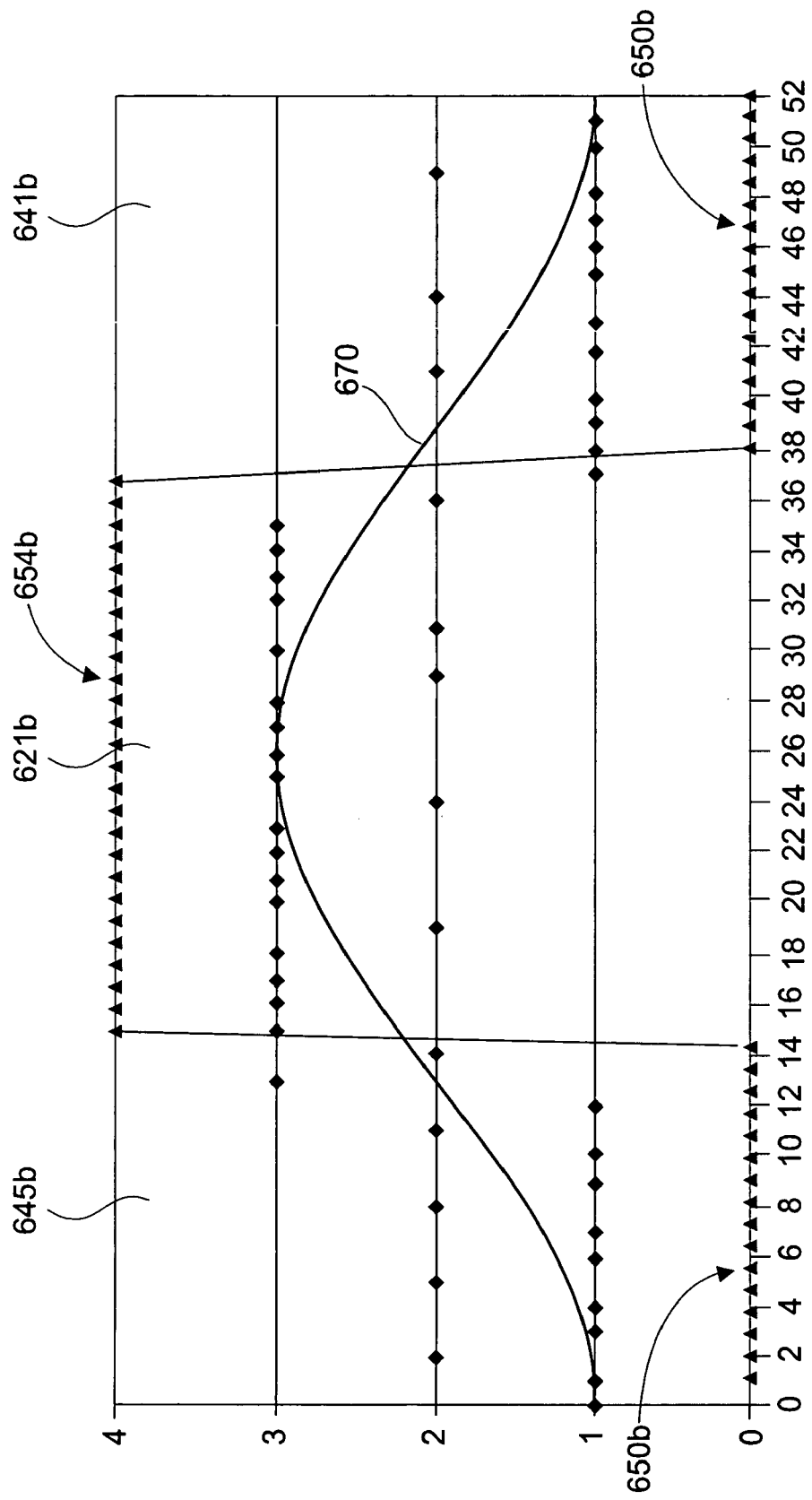
FIG. 6b illustrates the analysis of sampled spokes data of an identified group/period in the spokes data of FIG. 6a in more detail.

FIGS. 6a and 6b illustrate a first example for the analysis of sampled spokes data of a wheel having five equidistant spokes 621, 622, . . . , 625, which are spaced by equidistant spaces 641, 642, . . . , 645. In the diagram of FIG. 6a all sampled spokes data, which are already weighted (or quantized) as described above, are depicted. Sample values on the vertical line 1 are clearly recognized as spaces and sample values on the vertical line 3 as spokes. On the vertical line 2 samples of the scanner, which are noisy or ambiguous, are located. Now a spokes map or spokes configuration data can be derived, which are located by the points on the vertical lines 0 and 4. In FIG. 6b an identified period of the spoke data of FIG. 6a is shown in greater detail. Therefore, only some more description is necessary. The harmonic with the index 5 is shown by the sinus curve 670, this is the strongest harmonic of the frequency domain representation of the spokes data. Strongest harmonic means the one having the greatest amplitude. When the analysis of the sampled spokes data generates the spoke configuration data, in the areas where there is plausibility for the presence of a spoke the values can be set on the line 4 (depicted in FIG. 6b by 654b). In turn, areas identified as spaces, values in the spoke configuration data can be set one the line 0 (depicted in FIG. 6b by 650b).

Figure 7A:
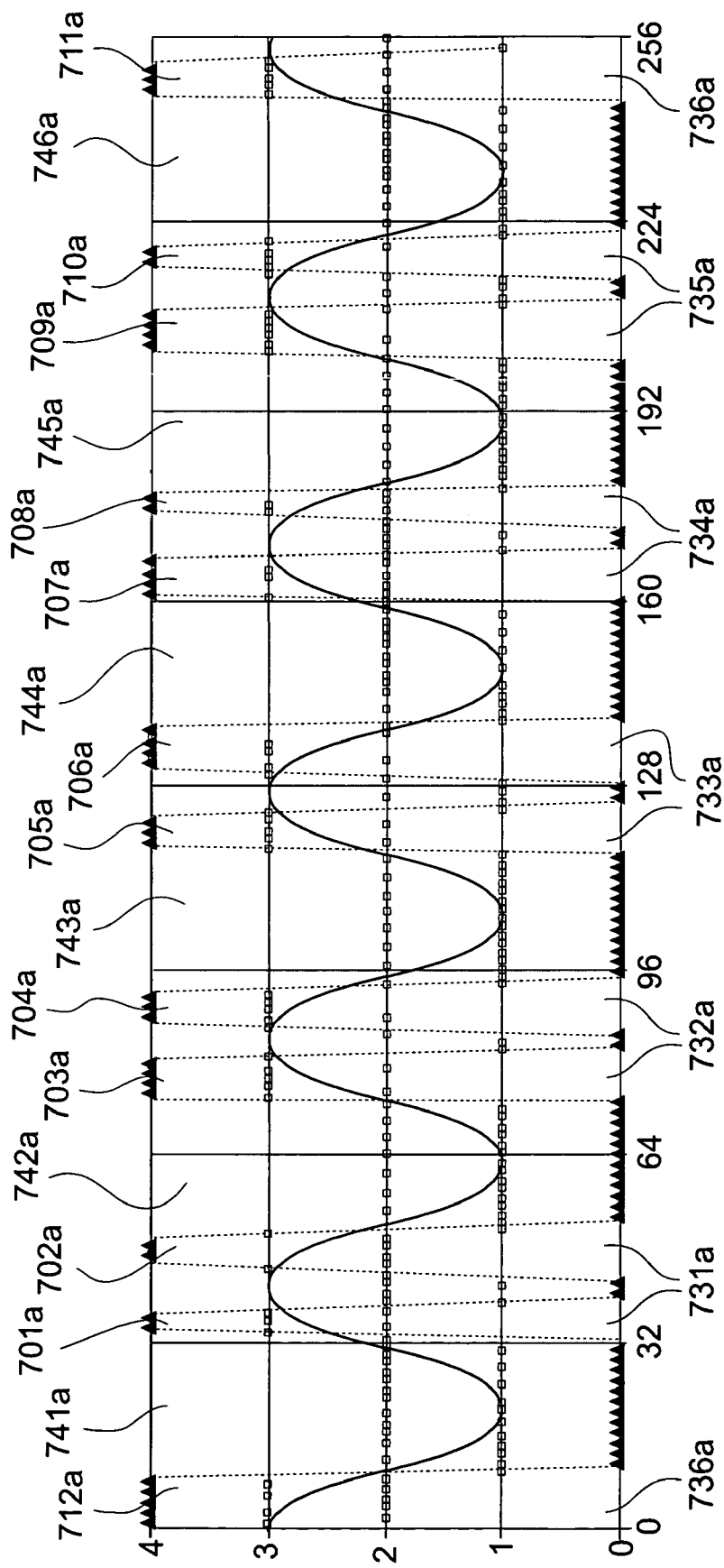
FIG. 7a shows another example for analyzed sampled spokes data and identification of 6 pairs of spokes.
Figure 7B:
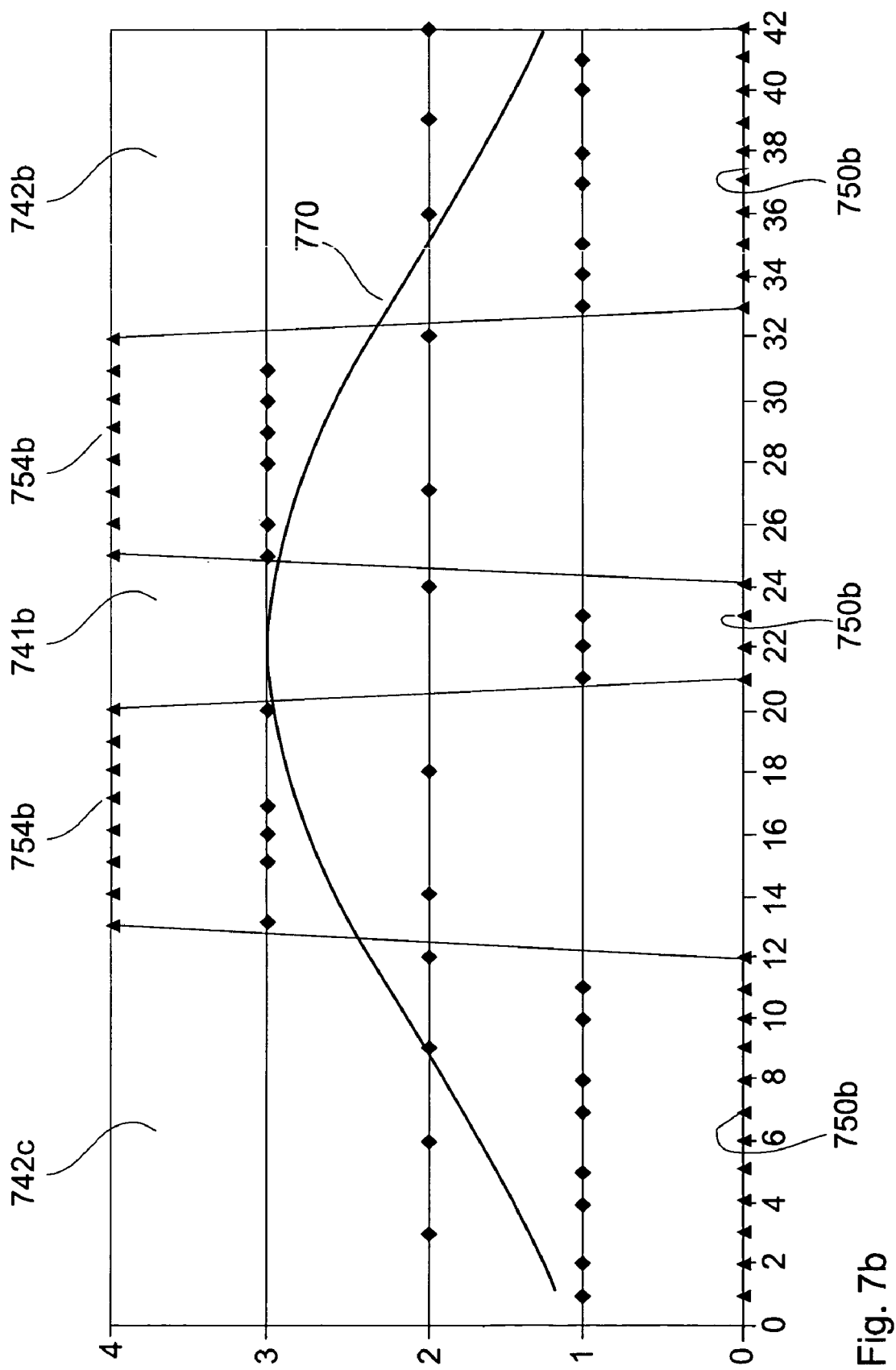
FIG. 7b illustrates the analysis of sampled spokes data of an identified group/period the spokes data of FIG. 7a in more detail.

FIGS. 7a and 7b illustrate a second example for the analysis of sampled spokes data of a wheel having six pairs 731a, 732a, . . . , 736a of spokes 701a, 702a, . . . , 712a, which are spaced by equidistant spaces 741a, 742a, . . . , 746a. In the diagram of FIG. 7a all sampled spokes data, which are already weighted (or quantized) as described above, are depicted. Sample values on the vertical line 1 are (recognized) spaces and sample values on the vertical line 3 are (recognized) spokes. On the vertical line 2 noisy samples are located. Again the spokes map or spokes configuration data can be derived, which are located by the points on the vertical lines 0 and 4.

In FIG. 7b an identified period of the spoke data of FIG. 7a is shown in greater detail. Therefore, only some more description is necessary. The harmonic with the index 6 is shown by the sinus curve 770. When the analysis of the sampled spokes data generates the spoke configuration data (a kind of spokes map), in the areas where there is plausibility for the presence of a spoke the values can be set on the line 4 (depicted in FIG. 7*b* by 754*b*). In turn, areas identified as spaces, values in the spoke configuration data can be set one the line 0 (depicted in FIG. 7*b* by 750*b*).

All the gathered information about the spoke configuration can be used as input for the HSP algorithm. In particular, the relation between an optimal position for a calculated balancing weight and the information about the spoke configuration can be used for splitting a balancing weight such that the respective two split balancing weights can be placed exactly behind the spokes nearby the position calculated. Since by the herein disclosed method the spoke configuration and the position of the optimal balancing weight is known, the HSP algorithm has as input the positions of the two spokes adjacent to the optimal balancing weight position, in order to hide the balancing weights behind those.

Once it has been determined where the optimal balancing weight should be placed, this position can be searched in the spoke configuration data or spoke mapping. Thus, the certain periodical group and the group's element that contain that optimal position can be identified. If the optimal weight position is between two spokes, the rim mapping can be studied to return the middle positions of the nearby spokes. If the weight position is already behind a spoke, the weight can remain in the optimal position or it can be split, if it is only partially hidden behind the spoke.

In one embodiment, it is considered the spoke width, to evaluate whether the balancing weight, split in two parts, can be wholly hidden or whether it will be partially visible. Alternatively, it is possible to always split the weight. Consequently, the resulting two weights are hidden behind the referring spoke and the next one, if the weight position is larger than middle point of spoke, or behind the previous one, if the position is minor than middle point of spoke. With respect to this aspect, several kinds of balancing weights have been examined and it has been found, that also be selecting a certain kind of weight the effect of the HSP can be influenced, in particular in cases where a certain weight would have a shape that would be partially visible, another kind of weight is not. Thus, in a further development besides the evaluated spoke configuration information, the position of the optimal balancing weight further the measurements of different kinds of balancing weights are taken into account. The following table illustrates this effect for several types of weights as an example.

| material | width (mm) | length (mm) | weight (g) | length per gram (mm/g) |
|---|---|---|---|---|
| Zn | 15 | 80 | 40 | 2.00 |
| Zn | 19 | 104 | 40 | 2.60 |
| Pb | 15 | 107 | 60 | 1.78 |
| Pb | 19 | 110 | 60 | 1.83 |
| Pb | 20 | 63 | 60 | 1.05 |
| Pb | 20 | 84 | 80 | 1.05 |
| Pb | 20 | 21 | 10 | 2.10 |
| Pb | 20 | 42 | 20 | 2.10 |
| Cu | 15 | 70 | 50 | 1.40 |
| Cu | 15 | 83 | 60 | 1.38 |

In a further development, the known data about the dimensions of available balancing weights and the derived spoke configuration data are considered such that it is determined whether a certain weight can be hided behind a certain determined spoke. In case a certain weight cannot be hided totally behind its spoke, the splitting of the balancing weight is iterated until a predetermined weight size is reached corresponding to the available spoke width. Thus, it is possible to achieve a high rate of successful hidden placed weights behind their respective spoke. In other words, the splitting of the balancing weight is iterated/repeated until the procedure arrives at smaller pieces of weights, which can be hided behind even thin spokes.

For instance, after a first splitting step, the calculated first and second spoke are checked whether the calculated weights can be totally hided behind the respective spoke. If one or both weight would be partially visible the respective weight and position of the respective spoke are used as new starting points to repeat the procedure of balancing weight splitting.

Detailed Example for Implementation By Use of a Pseudo-Code:

In the following an embodiment of an algorithm for implementation of a method according to one embodiment will be described in detail. For better illustration the example is enriched by the use of pseudo-code, which in turn is not intended as a limitation of the present disclosure.

For calculation of the Fourier Transform, the Fast Fourier Transform is implemented as a procedure spokes_fft( ). Accordingly, the vectors spokes_data[n] are processed by the spokes_fft( ) procedure. For every vector it is looked for the harmonic with the highest amplitude, the index j thereof and the phase arg thereof are respectively saved in the variables iNumberG[n] and xFirstP[n].

Figure 5:
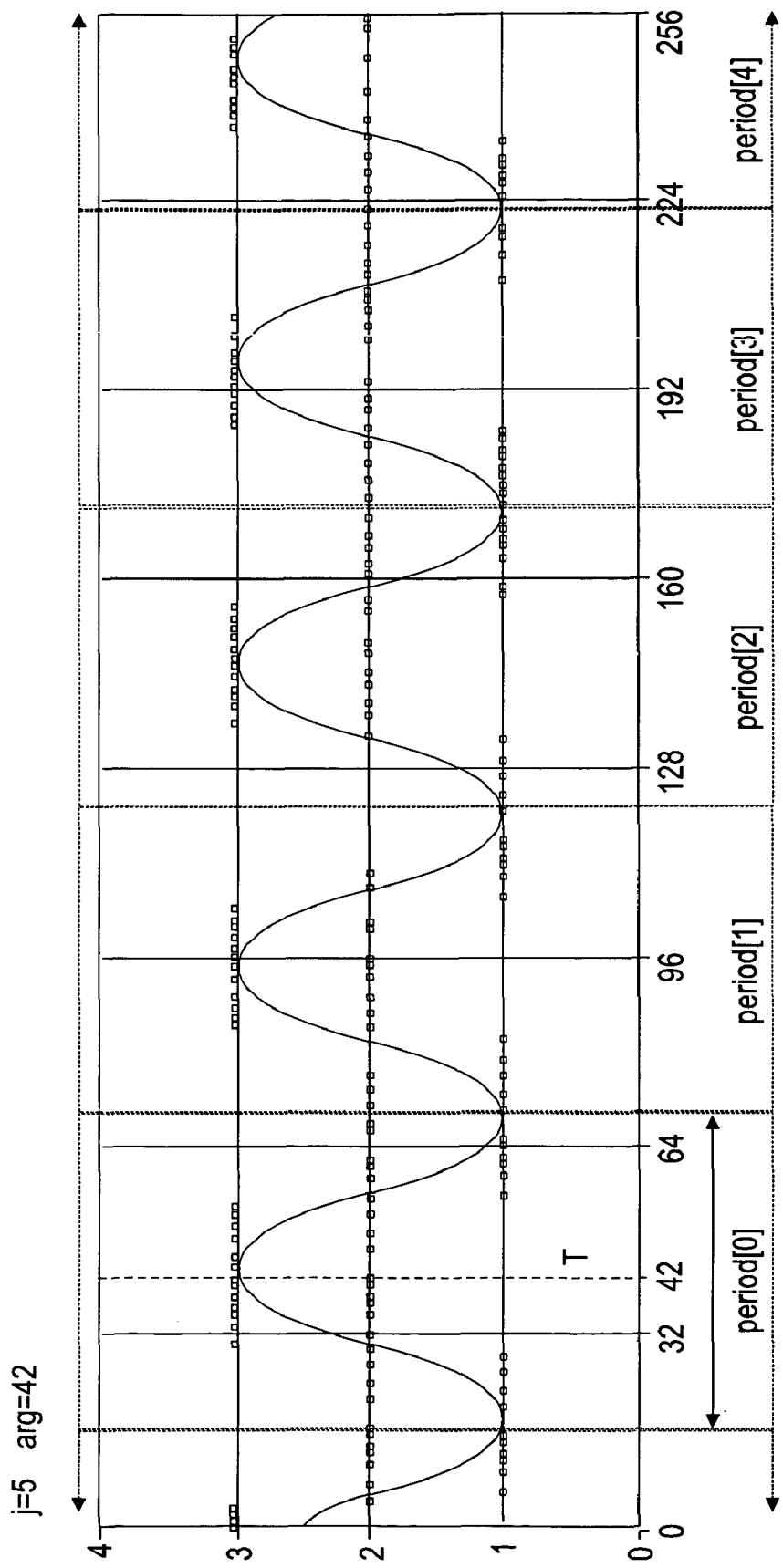
FIG. 5 illustrates an example for analysis of the sampled spokes data, in particular identification of spoke patterns.

Now with reference to FIG. 5, which illustrates collected spokes data values in a vector spokes_data[ ] and their processing through the Fourier Transform. In this example, j=5 and arg=42. The index j corresponds to the index of the harmonic with the highest amplitude and is interpreted as the number of periodical groups. The parameter arg, the phase of the harmonic j, is used as reference for the position of a periodical group related to the rim.

The plausibility assessment of this vector results to be positive, this vector is chosen to be further analyzed. Then dimension of the periodical group is determined as the number of vector elements that compose a single group. The period of a periodical group is k=256/j. Since k is a rational number, the period T is the set as the even number nearest to k. Given c=⌊k⌋,

```
if ( c mod 2 == 0 )
    T = c;
else T = c + 1;
```

Then, the matrix period[j][t] is built up, with (j=0, 1, 2, ..., J−1) and (t=0, 1, 2, ..., T−1). This matrix contains the j periodical groups recognized in the vector spokes_data[ ]:

```
for ( j = 0; j < J; j++ )
    for ( t = 0; t < T; t++ )
    {
        if ( arg < T/2 )
            x = arg + T/2 + t + j*T;
        else
            x = arg − T/2 + t + j*T;
        if ( x >= 256 )
            x −= 256;
        if ( x < 0 )
```

-continued
```
            x += 256;
            period[j][t] = spokes_data[x];
        }
```

Now, for every periodical group, single elements can be defined: spokes and spaces. To define spoke width, consecutive elements with value equal to 0, 2, 3 or 4 are counted (3 and 4 are values that surely point the presence of a spoke, 0 and 2 are instead values that don't let to discriminate between spokes and empty spaces), after finding a 3 or a 4.

When an element with value equal to 1 (spoke absence) is found, it is supposed that from this point an empty space begins, so all the elements equal to 0, 1 or 2 are counted, until a 3 or a 4 is found again. Thus, the empty space width is defined.

As a hypothesis, first element in the periodical group should be an empty space. After first space, there could be one or more spokes and equally one or more spaces. As a further hypothesis, it is decided that in one single periodical group there are at most 5 spokes and consequently 6 spaces. Both hypotheses may also be used as plausibility considerations.

Next, a structure may be defined to represent a spoke (bSpoke=true) or an empty space (bSpoke=false) and it stores his width:

```
typedef struct TElement
{
    bool bSpoke;
    int iWidth;
};
```

Then the matrix rElement[j][i] is set up, having (j=0, 1, 2, ..., J−1) and i=0, 1, ..., 11), and containing the i elements detected in the periodical group j:

```
for ( int t = 0; t < T; t++ )
    switch ( period[j][t] )
    {
        case 0:
        case 2:
            if ( t == 0 )
                rElement[j][i].bSpoke = false;   // i = 0;
            rElement[j][i].iWidth ++ ;
            break;
        case 1:
            if ( t == 0 )
                rElement[j][i].bSpoke = false;   // i = 0;
            if ( rElement[j][i]. bSpoke == true )
            {
                i++;
                rElement[j][i].bSpoke = false;
            }
            rElement[j][i].iWidth ++ ;
            break;
        case 3:
        case 4:
            if ( t == 0 )
                rElement[j][i].bSpoke = true;    // i = 0;
            if ( rElement[j][i].bSpoke == false )
            {
                i++;
                rElement[j][i].bSpoke = true;
            }
            rElement[j][i].iWidth ++ ;
            break;
    }
```

The vector iNumberElements[ ] saves the number of detected elements for every periodical group.

At the end of mapping process, the computation of mean spoke width is performed:

```
int iCount = 0, iGroupCount = 0;
double dMean = 0.0;
for ( j = 0; j < J; j++ )
    for ( i = 0; i < iNumberElements[j]; i++ )
        if ( rElement[j][i].bSpoke == true )
        {
            dMean += rElement[j][i].iWidth;
            iCount++;
            if ( rElement[j][i].iWidth >= SPOKE_WIDTH_MIN )
                iGroupCount++;
        }
dMean /= iCount;
if ( ( ( dMean >= SPOKE_WIDTH_MIN ) &&
    ( iGroupCount >= iCount/2 ) )
    WIDTH OK;
else
{
    INADEGUATE WIDTH;
    exit;
}
```

If mean spoke width is not larger than the threshold SPOKE_WIDTH_MIN, which in the present embodiment is set to 5, and if at least half amount of spokes has width not larger than the same threshold, the procedure ends due to the fact that the spoke dimensions are not enough for Hidden Spoke Placement.

If the spokes dimension check has a positive outcome, the procedure PreHSP(int iWeightPosition) sets the positions to hide the balancing weights behind those. The procedure input is the index of the weight not yet split, with reference to rim mapping in 256 steps. Of course, it is also possible to use a higher resolution, but good results have been reached with 256 steps.

The procedure first defines the weight periodical group (iWeightGroup: the group contains the established position of weight) and his position inside this group (iWeightPos-Group). Then, defines the group element (iWeightElement) and weight position inside this element (iWeightPosElement).

If weight should be placed where a space is present in the wheel (rElement[iWeightGroup][iWeightElement].bSpoke=false), the previous element (iPrevElement) and the next one (iPostElement) in the rim mapping identify the two spokes to hide the split weights behind those. Having the previous and the next elements, and having their widths, the middle points of spokes are calculated (iIndexPrev e iIndexPost) and they are given to the respective HSP algorithm.

If instead weight should be placed already partially hidden behind a spoke (rElement[iWeightGroup][iWeightElement].bSpoke=true), it has to be split behind the referring spoke and the next one, if the weight initial position is larger than middle point of spoke, or behind the previous one, if the position is minor than middle point of spoke.

Finally, the HSP procedure goes ahead as usual, splitting weight behind two spokes, wherein the respective procedure, for example called PreHSP(int iWeightPosition), provides the two positions to hide the spokes behind them.

While there have been shown and described and pointed out fundamental features of the invention as applied to the preferred embodiments thereof, it will be understood that various omissions and substitutions and changes in the form and details of the devices and methods described may be made by those skilled in the art without departing from the present invention. For example, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of designed choice. It is the intention, therefore, to be limited only as indicated by the scope of the claims appended hereto.

The embodiments of an apparatus for performing one of the methods described herein may include or be utilized with any appropriate voltage or current source, such as a battery, an alternator, a fuel cell, and the like, providing any appropriate current and/or voltage, such as about 12 Volts, about 42 Volts and the like.

Further, the embodiments described herein may be used with any desired system or engine. Those systems or engines may comprise items utilizing fossil fuels, such as gasoline, natural gas, propane and the like, electricity, such as that generated by battery, magneto, fuel cell, solar cell and the like, wind and hybrids or combinations thereof. Those systems or engines may be incorporated into other combinations into other systems, such as an automobile, a truck, a boat or ship, a motorcycle, a generator, an airplane and the like.

In the following two examples as reduction to practice are shortly described. However, it should be noted that these examples have merely the purpose of providing working examples helping to get the whole picture of the described embodiments and developments of the method and the apparatus. Hence, these examples are not intended as a limitation. The scope of protection is only defined by the claims attached hereto.

EXAMPLE 1

As an assumption, a vehicle wheel to be balanced has 5 equidistant spokes as, for instance, the wheel 100 shown in FIG. 1. In the table below are quoted the values of the matrix spokes_data[3][256] collected during the scanning of the spokes data. The spokes data are already weighted as described above:

|  | spoke_data[0] | spoke_data[1] | spoke_data[2] |
|---|---|---|---|
| spoke_data[ ][0] = | 2 | 2 | 1 |
| spoke_data[ ][1] = | 1 | 2 | 1 |
| spoke_data[ ][2] = | 1 | 1 | 2 |
| spoke_data[ ][3] = | 1 | 1 | 3 |
| spoke_data[ ][4] = | 1 | 3 | 3 |
| spoke_data[ ][5] = | 3 | 3 | 3 |
| spoke_data[ ][6] = | 2 | 3 | 3 |
| spoke_data[ ][7] = | 3 | 3 | 2 |
| spoke_data[ ][8] = | 3 | 3 | 3 |
| spoke_data[ ][9] = | 3 | 3 | 2 |
| spoke_data[ ][10] = | 3 | 3 | 3 |
| spoke_data[ ][11] = | 3 | 3 | 2 |

-continued

|  | spoke_data[0] | spoke_data[1] | spoke_data[2] |
|---|---|---|---|
| spoke_data[ ][12] = | 3 | 3 | 3 |
| spoke_data[ ][13] = | 3 | 3 | 2 |
| spoke_data[ ][14] = | 3 | 3 | 3 |
| spoke_data[ ][15] = | 3 | 3 | 3 |
| spoke_data[ ][16] = | 3 | 3 | 3 |
| spoke_data[ ][17] = | 3 | 3 | 3 |
| spoke_data[ ][18] = | 3 | 2 | 3 |
| spoke_data[ ][19] = | 3 | 3 | 3 |
| spoke_data[ ][20] = | 3 | 3 | 3 |
| spoke_data[ ][21] = | 3 | 3 | 2 |
| spoke_data[ ][22] = | 1 | 3 | 3 |
| spoke_data[ ][23] = | 1 | 4 | 3 |
| spoke_data[ ][24] = | 1 | 1 | 3 |
| spoke_data[ ][25] = | 2 | 1 | 1 |
| spoke_data[ ][26] = | 1 | 1 | 1 |
| spoke_data[ ][27] = | 1 | 2 | 1 |
| spoke_data[ ][28] = | 1 | 1 | 1 |
| spoke_data[ ][29] = | 1 | 1 | 1 |
| spoke_data[ ][30] = | 1 | 1 | 1 |
| spoke_data[ ][31] = | 1 | 1 | 1 |
| spoke_data[ ][32] = | 1 | 1 | 2 |
| spoke_data[ ][33] = | 1 | 1 | 1 |
| spoke_data[ ][34] = | 1 | 2 | 1 |
| spoke_data[ ][35] = | 1 | 1 | 1 |
| spoke_data[ ][36] = | 1 | 1 | 1 |
| spoke_data[ ][37] = | 2 | 1 | 1 |
| spoke_data[ ][38] = | 1 | 1 | 2 |
| spoke_data[ ][39] = | 1 | 2 | 1 |
| spoke_data[ ][40] = | 2 | 1 | 2 |
| spoke_data[ ][41] = | 1 | 1 | 1 |
| spoke_data[ ][42] = | 1 | 2 | 1 |
| spoke_data[ ][43] = | 1 | 1 | 2 |
| spoke_data[ ][44] = | 1 | 1 | 1 |
| spoke_data[ ][45] = | 2 | 1 | 1 |
| spoke_data[ ][46] = | 1 | 1 | 1 |
| spoke_data[ ][47] = | 1 | 2 | 1 |
| spoke_data[ ][48] = | 1 | 1 | 2 |
| spoke_data[ ][49] = | 1 | 1 | 1 |
| spoke_data[ ][50] = | 1 | 2 | 1 |
| spoke_data[ ][51] = | 1 | 1 | 1 |
| spoke_data[ ][52] = | 1 | 1 | 1 |
| spoke_data[ ][53] = | 1 | 1 | 2 |
| spoke_data[ ][54] = | 1 | 1 | 2 |
| spoke_data[ ][55] = | 1 | 2 | 3 |
| spoke_data[ ][56] = | 3 | 3 | 3 |
| spoke_data[ ][57] = | 2 | 2 | 3 |
| spoke_data[ ][58] = | 3 | 3 | 3 |
| spoke_data[ ][59] = | 2 | 3 | 3 |
| spoke_data[ ][60] = | 3 | 3 | 3 |
| spoke_data[ ][61] = | 2 | 3 | 3 |
| spoke_data[ ][62] = | 3 | 3 | 3 |
| spoke_data[ ][63] = | 3 | 3 | 3 |
| spoke_data[ ][64] = | 3 | 3 | 3 |
| spoke_data[ ][65] = | 3 | 3 | 3 |
| spoke_data[ ][66] = | 3 | 3 | 3 |
| spoke_data[ ][67] = | 3 | 3 | 3 |
| spoke_data[ ][68] = | 3 | 2 | 3 |
| spoke_data[ ][69] = | 3 | 3 | 3 |
| spoke_data[ ][70] = | 3 | 2 | 3 |
| spoke_data[ ][71] = | 3 | 3 | 3 |
| spoke_data[ ][72] = | 3 | 3 | 3 |
| spoke_data[ ][73] = | 3 | 3 | 3 |
| spoke_data[ ][74] = | 2 | 3 | 3 |
| spoke_data[ ][75] = | 1 | 1 | 4 |
| spoke_data[ ][76] = | 1 | 1 | 1 |
| spoke_data[ ][77] = | 1 | 1 | 1 |
| spoke_data[ ][78] = | 1 | 1 | 1 |
| spoke_data[ ][79] = | 1 | 1 | 1 |
| spoke_data[ ][80] = | 1 | 1 | 1 |
| spoke_data[ ][81] = | 1 | 1 | 2 |
| spoke_data[ ][82] = | 1 | 1 | 1 |
| spoke_data[ ][83] = | 2 | 1 | 1 |
| spoke_data[ ][84] = | 1 | 1 | 1 |
| spoke_data[ ][85] = | 1 | 1 | 1 |
| spoke_data[ ][86] = | 1 | 1 | 1 |
| spoke_data[ ][87] = | 1 | 2 | 2 |
| spoke_data[ ][88] = | 1 | 1 | 1 |

-continued

| | spoke_data[0] | spoke_data[1] | spoke_data[2] |
|---|---|---|---|
| spoke_data[ ][89] = | 1 | 1 | 1 |
| spoke_data[ ][90] = | 1 | 1 | 1 |
| spoke_data[ ][91] = | 1 | 2 | 1 |
| spoke_data[ ][92] = | 1 | 1 | 2 |
| spoke_data[ ][93] = | 1 | 1 | 1 |
| spoke_data[ ][94] = | 1 | 2 | 1 |
| spoke_data[ ][95] = | 1 | 1 | 2 |
| spoke_data[ ][96] = | 1 | 1 | 1 |
| spoke_data[ ][97] = | 1 | 1 | 1 |
| spoke_data[ ][98] = | 1 | 1 | 1 |
| spoke_data[ ][99] = | 2 | 2 | 1 |
| spoke_data[ ][100] = | 1 | 1 | 2 |
| spoke_data[ ][101] = | 1 | 1 | 1 |
| spoke_data[ ][102] = | 1 | 1 | 1 |
| spoke_data[ ][103] = | 1 | 1 | 1 |
| spoke_data[ ][104] = | 2 | 1 | 3 |
| spoke_data[ ][105] = | 1 | 2 | 2 |
| spoke_data[ ][106] = | 1 | 3 | 3 |
| spoke_data[ ][107] = | 3 | 2 | 3 |
| spoke_data[ ][108] = | 3 | 2 | 3 |
| spoke_data[ ][109] = | 2 | 3 | 3 |
| spoke_data[ ][110] = | 3 | 2 | 3 |
| spoke_data[ ][111] = | 3 | 3 | 3 |
| spoke_data[ ][112] = | 3 | 2 | 3 |
| spoke_data[ ][113] = | 3 | 3 | 3 |
| spoke_data[ ][114] = | 3 | 2 | 3 |
| spoke_data[ ][115] = | 3 | 3 | 2 |
| spoke_data[ ][116] = | 3 | 2 | 3 |
| spoke_data[ ][117] = | 3 | 3 | 3 |
| spoke_data[ ][118] = | 3 | 2 | 3 |
| spoke_data[ ][119] = | 3 | 3 | 3 |
| spoke_data[ ][120] = | 2 | 2 | 3 |
| spoke_data[ ][121] = | 3 | 3 | 3 |
| spoke_data[ ][122] = | 2 | 2 | 3 |
| spoke_data[ ][123] = | 3 | 3 | 3 |
| spoke_data[ ][124] = | 2 | 3 | 3 |
| spoke_data[ ][125] = | 1 | 1 | 3 |
| spoke_data[ ][126] = | 2 | 1 | 3 |
| spoke_data[ ][127] = | 1 | 2 | 1 |
| spoke_data[ ][128] = | 1 | 1 | 1 |
| spoke_data[ ][129] = | 2 | 2 | 1 |
| spoke_data[ ][130] = | 1 | 1 | 1 |
| spoke_data[ ][131] = | 2 | 2 | 1 |
| spoke_data[ ][132] = | 1 | 1 | 2 |
| spoke_data[ ][133] = | 2 | 2 | 1 |
| spoke_data[ ][134] = | 2 | 2 | 1 |
| spoke_data[ ][135] = | 1 | 1 | 1 |
| spoke_data[ ][136] = | 2 | 2 | 1 |
| spoke_data[ ][137] = | 1 | 1 | 1 |
| spoke_data[ ][138] = | 2 | 2 | 1 |
| spoke_data[ ][139] = | 1 | 1 | 1 |
| spoke_data[ ][140] = | 1 | 1 | 1 |
| spoke_data[ ][141] = | 1 | 2 | 2 |
| spoke_data[ ][142] = | 1 | 1 | 1 |
| spoke_data[ ][143] = | 2 | 1 | 1 |
| spoke_data[ ][144] = | 1 | 1 | 2 |
| spoke_data[ ][145] = | 1 | 1 | 1 |
| spoke_data[ ][146] = | 2 | 1 | 1 |
| spoke_data[ ][147] = | 1 | 1 | 1 |
| spoke_data[ ][148] = | 2 | 1 | 1 |
| spoke_data[ ][149] = | 1 | 2 | 2 |
| spoke_data[ ][150] = | 1 | 1 | 1 |
| spoke_data[ ][151] = | 2 | 1 | 1 |
| spoke_data[ ][152] = | 1 | 1 | 2 |
| spoke_data[ ][153] = | 2 | 1 | 1 |
| spoke_data[ ][154] = | 1 | 1 | 1 |
| spoke_data[ ][155] = | 1 | 1 | 3 |
| spoke_data[ ][156] = | 2 | 1 | 3 |
| spoke_data[ ][157] = | 1 | 1 | 3 |
| spoke_data[ ][158] = | 2 | 3 | 3 |
| spoke_data[ ][159] = | 2 | 3 | 3 |
| spoke_data[ ][160] = | 3 | 3 | 3 |
| spoke_data[ ][161] = | 2 | 3 | 3 |
| spoke_data[ ][162] = | 3 | 3 | 3 |
| spoke_data[ ][163] = | 3 | 2 | 3 |
| spoke_data[ ][164] = | 3 | 3 | 3 |
| spoke_data[ ][165] = | 3 | 2 | 3 |
| spoke_data[ ][166] = | 3 | 3 | 3 |
| spoke_data[ ][167] = | 3 | 3 | 3 |
| spoke_data[ ][168] = | 3 | 3 | 3 |
| spoke_data[ ][169] = | 3 | 3 | 3 |
| spoke_data[ ][170] = | 3 | 3 | 3 |
| spoke_data[ ][171] = | 3 | 3 | 3 |
| spoke_data[ ][172] = | 3 | 3 | 3 |
| spoke_data[ ][173] = | 3 | 3 | 3 |
| spoke_data[ ][174] = | 3 | 3 | 3 |
| spoke_data[ ][175] = | 3 | 3 | 3 |
| spoke_data[ ][176] = | 1 | 1 | 3 |
| spoke_data[ ][177] = | 1 | 1 | 3 |
| spoke_data[ ][178] = | 1 | 2 | 1 |
| spoke_data[ ][179] = | 1 | 1 | 1 |
| spoke_data[ ][180] = | 2 | 2 | 1 |
| spoke_data[ ][181] = | 1 | 1 | 1 |
| spoke_data[ ][182] = | 1 | 1 | 1 |
| spoke_data[ ][183] = | 1 | 1 | 1 |
| spoke_data[ ][184] = | 1 | 1 | 1 |
| spoke_data[ ][185] = | 2 | 2 | 1 |
| spoke_data[ ][186] = | 1 | 1 | 1 |
| spoke_data[ ][187] = | 1 | 1 | 1 |
| spoke_data[ ][188] = | 1 | 1 | 1 |
| spoke_data[ ][189] = | 1 | 1 | 1 |
| spoke_data[ ][190] = | 1 | 1 | 1 |
| spoke_data[ ][191] = | 1 | 1 | 1 |
| spoke_data[ ][192] = | 1 | 2 | 1 |
| spoke_data[ ][193] = | 1 | 1 | 1 |
| spoke_data[ ][194] = | 1 | 1 | 1 |
| spoke_data[ ][195] = | 1 | 1 | 1 |
| spoke_data[ ][196] = | 1 | 1 | 1 |
| spoke_data[ ][197] = | 1 | 1 | 1 |
| spoke_data[ ][198] = | 1 | 2 | 1 |
| spoke_data[ ][199] = | 1 | 1 | 1 |
| spoke_data[ ][200] = | 2 | 1 | 1 |
| spoke_data[ ][201] = | 1 | 1 | 1 |
| spoke_data[ ][202] = | 1 | 1 | 1 |
| spoke_data[ ][203] = | 2 | 2 | 1 |
| spoke_data[ ][204] = | 1 | 1 | 1 |
| spoke_data[ ][205] = | 2 | 1 | 1 |
| spoke_data[ ][206] = | 1 | 2 | 4 |
| spoke_data[ ][207] = | 1 | 1 | 3 |
| spoke_data[ ][208] = | 1 | 1 | 3 |
| spoke_data[ ][209] = | 2 | 3 | 3 |
| spoke_data[ ][210] = | 3 | 3 | 3 |
| spoke_data[ ][211] = | 3 | 3 | 2 |
| spoke_data[ ][212] = | 3 | 3 | 3 |
| spoke_data[ ][213] = | 3 | 3 | 3 |
| spoke_data[ ][214] = | 3 | 3 | 3 |
| spoke_data[ ][215] = | 2 | 3 | 2 |
| spoke_data[ ][216] = | 3 | 3 | 3 |
| spoke_data[ ][217] = | 2 | 2 | 2 |
| spoke_data[ ][218] = | 3 | 3 | 3 |
| spoke_data[ ][219] = | 2 | 3 | 3 |
| spoke_data[ ][220] = | 3 | 3 | 3 |
| spoke_data[ ][221] = | 3 | 3 | 3 |
| spoke_data[ ][222] = | 3 | 3 | 3 |
| spoke_data[ ][223] = | 3 | 3 | 3 |
| spoke_data[ ][224] = | 3 | 3 | 3 |
| spoke_data[ ][225] = | 3 | 3 | 3 |
| spoke_data[ ][226] = | 3 | 3 | 3 |
| spoke_data[ ][227] = | 1 | 3 | 3 |
| spoke_data[ ][228] = | 1 | 2 | 3 |
| spoke_data[ ][229] = | 2 | 1 | 3 |
| spoke_data[ ][230] = | 1 | 2 | 1 |
| spoke_data[ ][231] = | 1 | 1 | 1 |
| spoke_data[ ][232] = | 1 | 2 | 1 |
| spoke_data[ ][233] = | 1 | 1 | 1 |
| spoke_data[ ][234] = | 1 | 2 | 2 |
| spoke_data[ ][235] = | 1 | 1 | 1 |
| spoke_data[ ][236] = | 2 | 1 | 2 |
| spoke_data[ ][237] = | 1 | 2 | 1 |
| spoke_data[ ][238] = | 1 | 1 | 2 |
| spoke_data[ ][239] = | 1 | 2 | 1 |
| spoke_data[ ][240] = | 1 | 1 | 1 |
| spoke_data[ ][241] = | 1 | 1 | 2 |
| spoke_data[ ][242] = | 1 | 2 | 1 |

-continued

| | spoke_data[0] | spoke_data[1] | spoke_data[2] |
|---|---|---|---|
| spoke_data[ ][243] = | 1 | 1 | 1 |
| spoke_data[ ][244] = | 1 | 2 | 1 |
| spoke_data[ ][245] = | 1 | 1 | 1 |
| spoke_data[ ][246] = | 2 | 1 | 1 |
| spoke_data[ ][247] = | 1 | 2 | 2 |
| spoke_data[ ][248] = | 2 | 1 | 1 |
| spoke_data[ ][249] = | 1 | 2 | 1 |
| spoke_data[ ][250] = | 1 | 2 | 2 |
| spoke_data[ ][251] = | 2 | 1 | 2 |
| spoke_data[ ][252] = | 1 | 2 | 1 |
| spoke_data[ ][253] = | 2 | 2 | 1 |
| spoke_data[ ][254] = | 1 | 2 | 1 |
| spoke_data[ ][255] = | 1 | 2 | 2 |

The consecutive transformation of the values by means of the FFT (the procedure SpokesFft(int n)) provides:

| | |
|---|---|
| iNumberG[0] = 5 | xFirstP[0] = 13 |
| iNumberG[1] = 5 | xFirstP[1] = 13 |
| iNumberG[2] = 5 | xFirstP[2] = 12 |

Figure 8A:
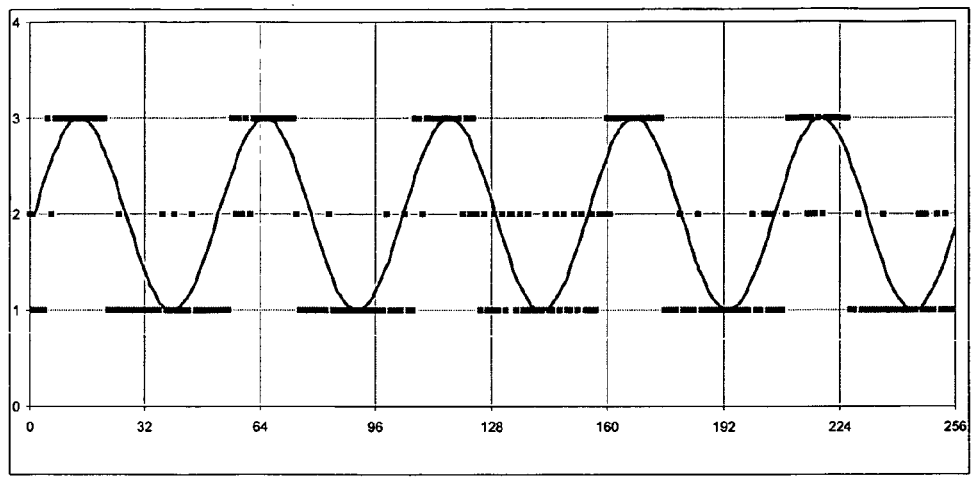
FIG. 8a-8d is illustration for a first detailed working example of the appendix to the description.
Figure 8B:
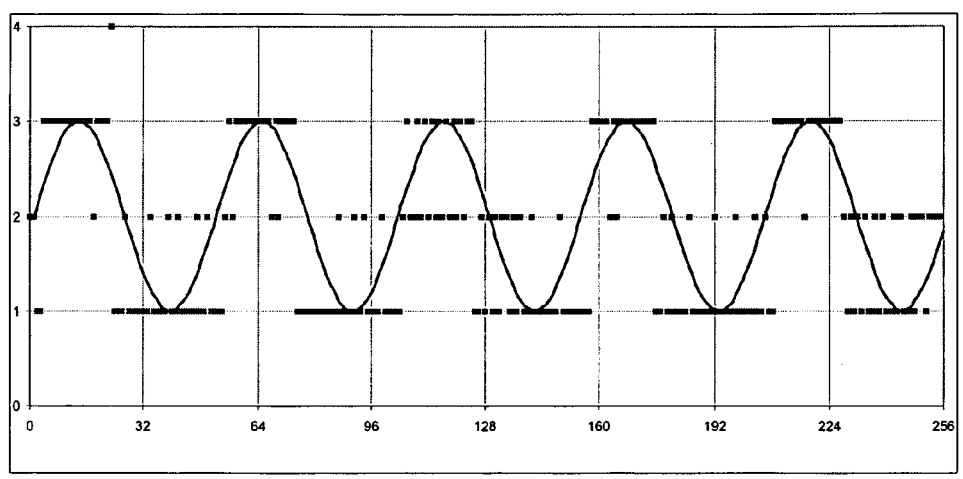
Figure 8C:
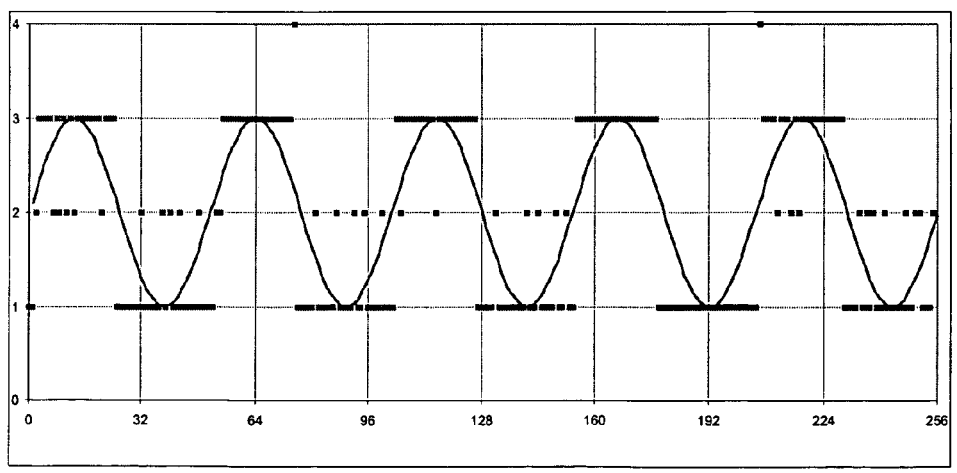
Figure 8D:
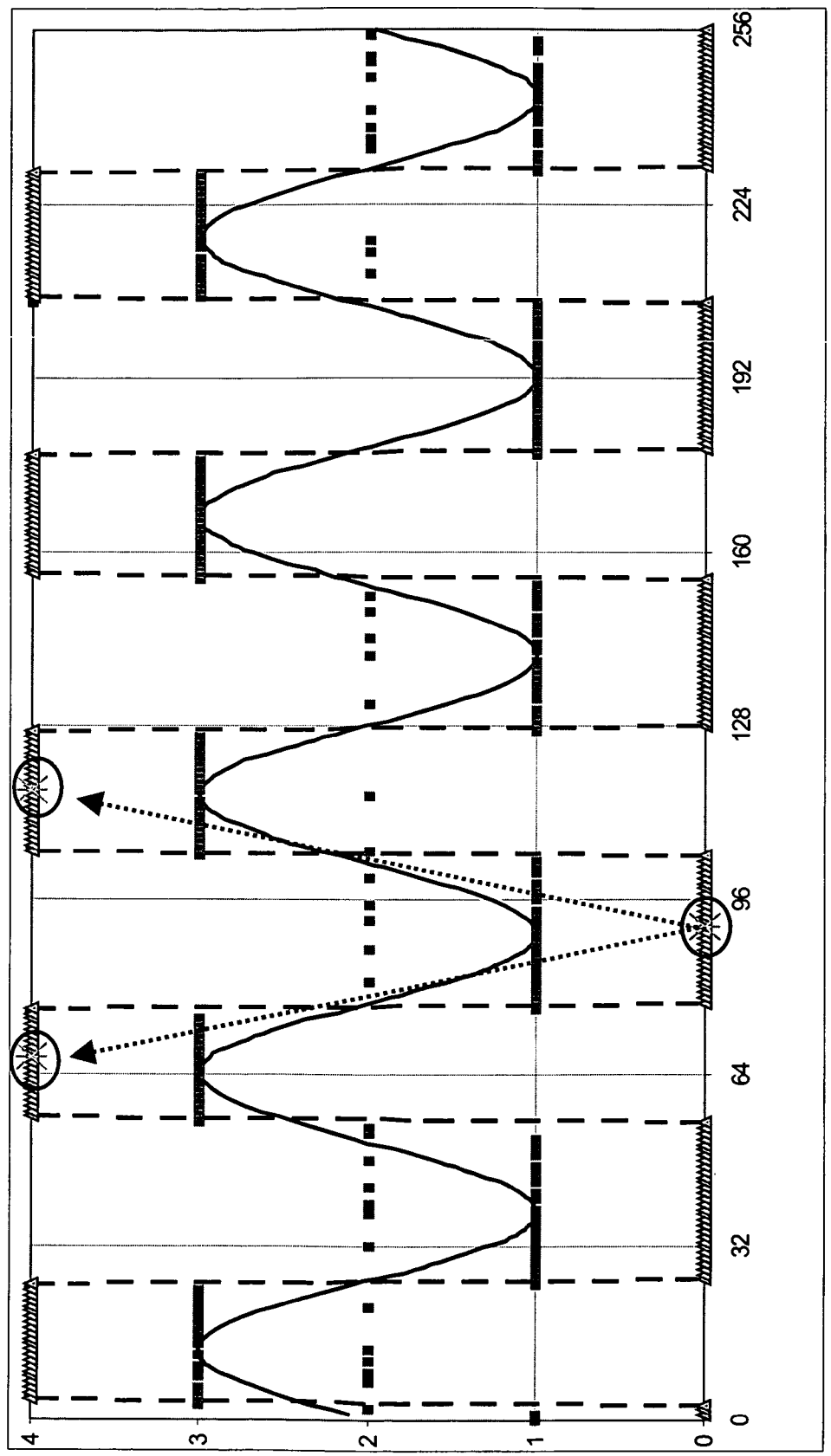

In the FIGS. 8*a* to 8*c* the vectors spoke_data[0], spoke_data[1], and spoke_data[2] are illustrated. A detailed description of these Figures is omitted for sake of brevity. It is noted that the FIG. 8*a* to 8*d* can be interpreted as FIGS. 6*a* to 7*b* above.

As vector spokes_data[2][256] comprises enough elements with value equal to 1 (iCountSpaces=117) and equal to 3 or 4 (iCountSpokes=103), it is chosen as the vector for deeper examination. Further, as the numbers of periodical groups are equal for each vector (iNumberG[2]=iNumberG[1]=iNumberG[0]=5), the values calculated for chosen vector are considered as valid:

iNumberGroups=iNumberG[2]=5 xFirstPosition=xFirstP[2]=12

The period length is given from:

$k = 256/iNumberGroups = 51.2$ $c = 51$ $c \bmod 2 \mathbin{!}= 0 \rightarrow T = c+1 = 52$ Now the periodical groups can be defined:

| Group number 0 | Group number 1 | Group number 2 |
|---|---|---|
| spoke_data[2][38] = 2 | spoke_data[2][90] = 1 | spoke_data[2][142] = 1 |
| spoke_data[2][39] = 1 | spoke_data[2][91] = 1 | spoke_data[2][143] = 1 |
| spoke_data[2][40] = 2 | spoke_data[2][92] = 2 | spoke_data[2][144] = 2 |
| spoke_data[2][41] = 1 | spoke_data[2][93] = 1 | spoke_data[2][145] = 1 |
| spoke_data[2][42] = 1 | spoke_data[2][94] = 1 | spoke_data[2][146] = 1 |
| spoke_data[2][43] = 2 | spoke_data[2][95] = 2 | spoke_data[2][147] = 1 |
| spoke_data[2][44] = 1 | spoke_data[2][96] = 1 | spoke_data[2][148] = 1 |
| spoke_data[2][45] = 1 | spoke_data[2][97] = 1 | spoke_data[2][149] = 2 |
| spoke_data[2][46] = 1 | spoke_data[2][98] = 1 | spoke_data[2][150] = 1 |
| spoke_data[2][47] = 1 | spoke_data[2][99] = 1 | spoke_data[2][151] = 1 |
| spoke_data[2][48] = 2 | spoke_data[2][100] = 2 | spoke_data[2][152] = 2 |
| spoke_data[2][49] = 1 | spoke_data[2][101] = 1 | spoke_data[2][153] = 1 |
| spoke_data[2][50] = 1 | spoke_data[2][102] = 1 | spoke_data[2][154] = 1 |
| spoke_data[2][51] = 1 | spoke_data[2][103] = 1 | spoke_data[2][155] = 3 |
| spoke_data[2][52] = 1 | spoke_data[2][104] = 3 | spoke_data[2][156] = 3 |
| spoke_data[2][53] = 2 | spoke_data[2][105] = 2 | spoke_data[2][157] = 3 |
| spoke_data[2][54] = 2 | spoke_data[2][106] = 3 | spoke_data[2][158] = 3 |
| spoke_data[2][55] = 3 | spoke_data[2][107] = 3 | spoke_data[2][159] = 3 |
| spoke_data[2][56] = 3 | spoke_data[2][108] = 3 | spoke_data[2][160] = 3 |
| spoke_data[2][57] = 3 | spoke_data[2][109] = 3 | spoke_data[2][161] = 3 |
| spoke_data[2][58] = 3 | spoke_data[2][110] = 3 | spoke_data[2][162] = 3 |
| spoke_data[2][59] = 3 | spoke_data[2][111] = 3 | spoke_data[2][163] = 3 |
| spoke_data[2][60] = 3 | spoke_data[2][112] = 3 | spoke_data[2][164] = 3 |
| spoke_data[2][61] = 3 | spoke_data[2][113] = 3 | spoke_data[2][165] = 3 |
| spoke_data[2][62] = 3 | spoke_data[2][114] = 3 | spoke_data[2][166] = 3 |
| spoke_data[2][63] = 3 | spoke_data[2][115] = 2 | spoke_data[2][167] = 3 |
| spoke_data[2][64] = 3 | spoke_data[2][116] = 3 | spoke_data[2][168] = 3 |
| spoke_data[2][65] = 3 | spoke_data[2][117] = 3 | spoke_data[2][169] = 3 |
| spoke_data[2][66] = 3 | spoke_data[2][118] = 3 | spoke_data[2][170] = 3 |
| spoke_data[2][67] = 3 | spoke_data[2][119] = 3 | spoke_data[2][171] = 3 |
| spoke_data[2][68] = 3 | spoke_data[2][120] = 3 | spoke_data[2][172] = 3 |
| spoke_data[2][69] = 3 | spoke_data[2][121] = 3 | spoke_data[2][173] = 3 |
| spoke_data[2][70] = 3 | spoke_data[2][122] = 3 | spoke_data[2][174] = 3 |
| spoke_data[2][71] = 3 | spoke_data[2][123] = 3 | spoke_data[2][175] = 3 |
| spoke_data[2][72] = 3 | spoke_data[2][124] = 3 | spoke_data[2][176] = 3 |
| spoke_data[2][73] = 3 | spoke_data[2][125] = 3 | spoke_data[2][177] = 3 |
| spoke_data[2][74] = 3 | spoke_data[2][126] = 3 | spoke_data[2][178] = 1 |
| spoke_data[2][75] = 4 | spoke_data[2][127] = 1 | spoke_data[2][179] = 1 |
| spoke_data[2][76] = 1 | spoke_data[2][128] = 1 | spoke_data[2][180] = 1 |
| spoke_data[2][77] = 1 | spoke_data[2][129] = 1 | spoke_data[2][181] = 1 |
| spoke_data[2][78] = 1 | spoke_data[2][130] = 1 | spoke_data[2][182] = 1 |
| spoke_data[2][79] = 1 | spoke_data[2][131] = 1 | spoke_data[2][183] = 1 |
| spoke_data[2][80] = 1 | spoke_data[2][132] = 2 | spoke_data[2][184] = 1 |
| spoke_data[2][81] = 2 | spoke_data[2][133] = 1 | spoke_data[2][185] = 1 |

-continued

| | | |
|---|---|---|
| spoke_data[2][82] = 1 | spoke_data[2][134] = 1 | spoke_data[2][186] = 1 |
| spoke_data[2][83] = 1 | spoke_data[2][135] = 1 | spoke_data[2][187] = 1 |
| spoke_data[2][84] = 1 | spoke_data[2][136] = 1 | spoke_data[2][188] = 1 |
| spoke_data[2][85] = 1 | spoke_data[2][137] = 1 | spoke_data[2][189] = 1 |
| spoke_data[2][86] = 1 | spoke_data[2][138] = 1 | spoke_data[2][190] = 1 |
| spoke_data[2][87] = 2 | spoke_data[2][139] = 1 | spoke_data[2][191] = 1 |
| spoke_data[2][88] = 1 | spoke_data[2][140] = 1 | spoke_data[2][192] = 1 |
| spoke_data[2][89] = 1 | spoke_data[2][141] = 2 | spoke_data[2][193] = 1 |

| Group number 3 | Group number 4 |
|---|---|
| spoke_data[2][194] = 1 | spoke_data[2][246] = 1 |
| spoke_data[2][195] = 1 | spoke_data[2][247] = 2 |
| spoke_data[2][196] = 1 | spoke_data[2][248] = 1 |
| spoke_data[2][197] = 1 | spoke_data[2][249] = 1 |
| spoke_data[2][198] = 1 | spoke_data[2][250] = 2 |
| spoke_data[2][199] = 1 | spoke_data[2][251] = 2 |
| spoke_data[2][200] = 1 | spoke_data[2][252] = 1 |
| spoke_data[2][201] = 1 | spoke_data[2][253] = 1 |
| spoke_data[2][202] = 1 | spoke_data[2][254] = 1 |
| spoke_data[2][203] = 1 | spoke_data[2][255] = 2 |
| spoke_data[2][204] = 1 | spoke_data[2][0] = 1 |
| spoke_data[2][205] = 1 | spoke_data[2][1] = 1 |
| spoke_data[2][206] = 4 | spoke_data[2][2] = 2 |
| spoke_data[2][207] = 3 | spoke_data[2][3] = 3 |
| spoke_data[2][208] = 3 | spoke_data[2][4] = 3 |
| spoke_data[2][209] = 3 | spoke_data[2][5] = 3 |
| spoke_data[2][210] = 3 | spoke_data[2][6] = 3 |
| spoke_data[2][211] = 2 | spoke_data[2][7] = 2 |
| spoke_data[2][212] = 3 | spoke_data[2][8] = 3 |
| spoke_data[2][213] = 3 | spoke_data[2][9] = 2 |
| spoke_data[2][214] = 3 | spoke_data[2][10] = 3 |
| spoke_data[2][215] = 2 | spoke_data[2][11] = 2 |
| spoke_data[2][216] = 3 | spoke_data[2][12] = 3 |
| spoke_data[2][217] = 2 | spoke_data[2][13] = 2 |
| spoke_data[2][218] = 3 | spoke_data[2][14] = 3 |
| spoke_data[2][219] = 3 | spoke_data[2][15] = 3 |
| spoke_data[2][220] = 3 | spoke_data[2][16] = 3 |
| spoke_data[2][221] = 3 | spoke_data[2][17] = 3 |
| spoke_data[2][222] = 3 | spoke_data[2][18] = 3 |
| spoke_data[2][223] = 3 | spoke_data[2][19] = 3 |
| spoke_data[2][224] = 3 | spoke_data[2][20] = 3 |
| spoke_data[2][225] = 3 | spoke_data[2][21] = 2 |
| spoke_data[2][226] = 3 | spoke_data[2][22] = 3 |
| spoke_data[2][227] = 3 | spoke_data[2][23] = 3 |
| spoke_data[2][228] = 3 | spoke_data[2][24] = 3 |
| spoke_data[2][229] = 3 | spoke_data[2][25] = 1 |
| spoke_data[2][230] = 1 | spoke_data[2][26] = 1 |
| spoke_data[2][231] = 1 | spoke_data[2][27] = 1 |
| spoke_data[2][232] = 1 | spoke_data[2][28] = 1 |
| spoke_data[2][233] = 1 | spoke_data[2][29] = 1 |
| spoke_data[2][234] = 2 | spoke_data[2][30] = 1 |
| spoke_data[2][235] = 1 | spoke_data[2][31] = 1 |
| spoke_data[2][236] = 2 | spoke_data[2][32] = 2 |
| spoke_data[2][237] = 1 | spoke_data[2][33] = 1 |
| spoke_data[2][238] = 2 | spoke_data[2][34] = 1 |
| spoke_data[2][239] = 1 | spoke_data[2][35] = 1 |
| spoke_data[2][240] = 1 | spoke_data[2][36] = 1 |
| spoke_data[2][241] = 2 | spoke_data[2][37] = 1 |
| spoke_data[2][242] = 1 | spoke_data[2][38] = 2 |
| spoke_data[2][243] = 1 | spoke_data[2][39] = 1 |
| spoke_data[2][244] = 1 | spoke_data[2][40] = 2 |
| spoke_data[2][245] = 1 | spoke_data[2][41] = 1 |

Then the elements of the periodical groups can be defined as:

| | Group number 0 | Group number 1 | Group number 2 | Group number 3 | Group number 4 |
|---|---|---|---|---|---|
| Element number 0 | space long 17 | space long 14 | space long 13 | space long 12 | space long 13 |
| Element number 1 | spoke long 21 | spoke long 23 | spoke long 23 | spoke long 24 | spoke long 22 |
| Element number 2 | space long 14 | space long 15 | space long 16 | space long 16 | space long 17 |

The mean spokes width is calculated and it is enough to go on:

iCount=5 iCount/2=2.5 dMean=(21+23+23+24+22)/5=113/5=22.6 iGroupCount=5 dMean>SPOKE_WIDTH_MIN iGroupCount>iCount/2

As a result from measurement of the unbalance of the wheel, it is assumed for this example that the unbalance found should be corrected placing a balancing weight on position represented by index 90, with reference to rim mapping in 256 steps, wherein a step corresponds to 1.4° of the rim circumference.

From procedure PreHSP(int iWeightPosition) it is so obtained: iWeightGroup=1, that is the periodical group where weight should be placed is number 1; iWeight-PosGroup=0, that is the weight should be placed in the first position of the periodical group; iWeightElement=0, that is the weight should be placed in the first element of the periodical group; iWeightPosElement=0, that is the weight should be placed in the first position of the first element of the periodical group.

The periodical group where weight should be placed is group 1. Group 1 comprises element number 0, which is a space, the length of which is 14 long; element number 1, a spoke, the width of which is 23 long; and element number 2, a space, the length of which is 15 long.

Consequently, the previous periodical group is group 0. Group 0 comprises element number 0, which is a space, the length of which is 17 long; element number 1, a spoke, the width of which is 21 long; and element number 2, a space, the length of which is 14 long.

Consequently, next periodical group is group 2. Group 2 comprises element number 0, which is a space, the length of which is 13 long; element number 1, a spoke, the width of which is 23 long; and element number 2, a space, the length of which is 16 long.

To sum it up, the optimal position for placement of the balancing weight has been identified by rElement[iWeightGroup][iWeightElement].bSpoke=false and rElement[iWeightGroup][iWeightElement].iWidth=14; that is the weight would be placed where there is an empty space long 14. The algorithm of the embodiment, therefore, performs the splitting of the optimal weight in two replacement weights, which can be placed hidden behind the previous and the next spoke with respect to the optimal position.

That is, the suitable position before that one calculated matches with the spoke of previous periodical group, identified by rElement[iGroupPre][iPrevElement].bSpoke=true and rElement[iGroupPre][iPrevElement].iWidth=21. The suitable position after that one calculated matches with the spoke of given periodical group, identified by rElement[iWeightGroup][iPostElement].bSpoke=true and rElement[iWeightGroup][iPostElement].iWidth=23.

The respective index related to the rim of the wheel which is mapped into 256 steps is iIndexPrev=66 and iIndexPost=115. As result, the balancing weight has to be split in two weights to place behind spokes given by index 66 and index 115.

EXAMPLE 2

As an assumption, a vehicle wheel to be balanced comprises 7 forked spokes; to be more precise they are bifurcate spokes, which means that a spoke branches into two branches, as, for instance, illustrated by the wheel 200d of FIG. 2d. In the table below are quoted the values of the matrix spokes_data[3][256] collected during the scanning of the spokes data. The spokes data are already weighted as described above:

| | spoke_data[0] | spoke_data[1] | spoke_data[2] |
|---|---|---|---|
| spoke_data[ ][0] = | 3 | 3 | 2 |
| spoke_data[ ][1] = | 3 | 3 | 3 |
| spoke_data[ ][2] = | 3 | 2 | 2 |
| spoke_data[ ][3] = | 3 | 3 | 1 |
| spoke_data[ ][4] = | 3 | 3 | 1 |
| spoke_data[ ][5] = | 3 | 3 | 1 |
| spoke_data[ ][6] = | 3 | 3 | 3 |
| spoke_data[ ][7] = | 3 | 3 | 3 |
| spoke_data[ ][8] = | 3 | 3 | 3 |
| spoke_data[ ][9] = | 3 | 3 | 3 |
| spoke_data[ ][10] = | 3 | 3 | 3 |
| spoke_data[ ][11] = | 3 | 3 | 1 |
| spoke_data[ ][12] = | 3 | 3 | 2 |
| spoke_data[ ][13] = | 1 | 1 | 1 |
| spoke_data[ ][14] = | 1 | 1 | 1 |
| spoke_data[ ][15] = | 2 | 1 | 1 |
| spoke_data[ ][16] = | 1 | 1 | 2 |
| spoke_data[ ][17] = | 1 | 1 | 2 |
| spoke_data[ ][18] = | 1 | 1 | 1 |
| spoke_data[ ][19] = | 1 | 2 | 1 |
| spoke_data[ ][20] = | 2 | 2 | 1 |
| spoke_data[ ][21] = | 2 | 2 | 1 |
| spoke_data[ ][22] = | 2 | 1 | 2 |
| spoke_data[ ][23] = | 1 | 1 | 1 |
| spoke_data[ ][24] = | 2 | 1 | 2 |
| spoke_data[ ][25] = | 1 | 1 | 1 |
| spoke_data[ ][26] = | 1 | 1 | 1 |
| spoke_data[ ][27] = | 1 | 2 | 1 |
| spoke_data[ ][28] = | 1 | 1 | 2 |
| spoke_data[ ][29] = | 2 | 1 | 1 |
| spoke_data[ ][30] = | 1 | 1 | 1 |
| spoke_data[ ][31] = | 1 | 2 | 2 |
| spoke_data[ ][32] = | 3 | 3 | 3 |
| spoke_data[ ][33] = | 3 | 3 | 2 |
| spoke_data[ ][34] = | 2 | 3 | 3 |
| spoke_data[ ][35] = | 3 | 3 | 3 |
| spoke_data[ ][36] = | 3 | 2 | 3 |
| spoke_data[ ][37] = | 3 | 3 | 3 |
| spoke_data[ ][38] = | 3 | 3 | 2 |
| spoke_data[ ][39] = | 3 | 3 | 1 |
| spoke_data[ ][40] = | 3 | 3 | 1 |
| spoke_data[ ][41] = | 3 | 3 | 1 |
| spoke_data[ ][42] = | 3 | 3 | 1 |
| spoke_data[ ][43] = | 3 | 3 | 2 |
| spoke_data[ ][44] = | 3 | 3 | 3 |
| spoke_data[ ][45] = | 3 | 3 | 2 |
| spoke_data[ ][46] = | 3 | 3 | 3 |
| spoke_data[ ][47] = | 3 | 3 | 2 |
| spoke_data[ ][48] = | 3 | 3 | 1 |
| spoke_data[ ][49] = | 3 | 1 | 1 |
| spoke_data[ ][50] = | 1 | 1 | 1 |
| spoke_data[ ][51] = | 1 | 2 | 1 |
| spoke_data[ ][52] = | 1 | 1 | 2 |
| spoke_data[ ][53] = | 1 | 2 | 2 |
| spoke_data[ ][54] = | 1 | 1 | 2 |
| spoke_data[ ][55] = | 1 | 1 | 1 |
| spoke_data[ ][56] = | 2 | 2 | 2 |
| spoke_data[ ][57] = | 2 | 2 | 1 |
| spoke_data[ ][58] = | 2 | 1 | 2 |
| spoke_data[ ][59] = | 2 | 1 | 1 |
| spoke_data[ ][60] = | 1 | 2 | 2 |
| spoke_data[ ][61] = | 1 | 1 | 2 |
| spoke_data[ ][62] = | 1 | 2 | 2 |
| spoke_data[ ][63] = | 1 | 1 | 2 |
| spoke_data[ ][64] = | 1 | 1 | 1 |
| spoke_data[ ][65] = | 1 | 1 | 2 |
| spoke_data[ ][66] = | 1 | 1 | 1 |
| spoke_data[ ][67] = | 2 | 2 | 1 |
| spoke_data[ ][68] = | 2 | 1 | 2 |

-continued

| | spoke_data[0] | spoke_data[1] | spoke_data[2] |
|---|---|---|---|
| spoke_data[ ][69] = | 3 | 3 | 2 |
| spoke_data[ ][70] = | 3 | 3 | 3 |
| spoke_data[ ][71] = | 3 | 3 | 3 |
| spoke_data[ ][72] = | 3 | 2 | 2 |
| spoke_data[ ][73] = | 3 | 3 | 3 |
| spoke_data[ ][74] = | 3 | 3 | 3 |
| spoke_data[ ][75] = | 3 | 3 | 1 |
| spoke_data[ ][76] = | 3 | 3 | 1 |
| spoke_data[ ][77] = | 3 | 3 | 2 |
| spoke_data[ ][78] = | 3 | 2 | 1 |
| spoke_data[ ][79] = | 3 | 3 | 4 |
| spoke_data[ ][80] = | 3 | 3 | 3 |
| spoke_data[ ][81] = | 3 | 3 | 3 |
| spoke_data[ ][82] = | 3 | 3 | 3 |
| spoke_data[ ][83] = | 3 | 3 | 2 |
| spoke_data[ ][84] = | 3 | 3 | 1 |
| spoke_data[ ][85] = | 3 | 1 | 1 |
| spoke_data[ ][86] = | 3 | 1 | 2 |
| spoke_data[ ][87] = | 1 | 2 | 1 |
| spoke_data[ ][88] = | 1 | 1 | 2 |
| spoke_data[ ][99] = | 1 | 2 | 2 |
| spoke_data[ ][90] = | 1 | 1 | 2 |
| spoke_data[ ][91] = | 1 | 2 | 1 |
| spoke_data[ ][92] = | 1 | 2 | 2 |
| spoke_data[ ][93] = | 1 | 2 | 2 |
| spoke_data[ ][94] = | 2 | 2 | 3 |
| spoke_data[ ][95] = | 2 | 1 | 3 |
| spoke_data[ ][96] = | 2 | 2 | 1 |
| spoke_data[ ][97] = | 1 | 1 | 1 |
| spoke_data[ ][98] = | 1 | 2 | 1 |
| spoke_data[ ][99] = | 1 | 1 | 2 |
| spoke_data[ ][100] = | 2 | 1 | 1 |
| spoke_data[ ][101] = | 1 | 1 | 2 |
| spoke_data[ ][102] = | 1 | 1 | 2 |
| spoke_data[ ][103] = | 1 | 2 | 1 |
| spoke_data[ ][104] = | 3 | 2 | 1 |
| spoke_data[ ][105] = | 3 | 2 | 2 |
| spoke_data[ ][106] = | 3 | 3 | 3 |
| spoke_data[ ][107] = | 3 | 3 | 3 |
| spoke_data[ ][108] = | 3 | 3 | 3 |
| spoke_data[ ][109] = | 3 | 3 | 3 |
| spoke_data[ ][110] = | 3 | 3 | 3 |
| spoke_data[ ][111] = | 3 | 3 | 1 |
| spoke_data[ ][112] = | 2 | 3 | 1 |
| spoke_data[ ][113] = | 3 | 3 | 1 |
| spoke_data[ ][114] = | 3 | 3 | 1 |
| spoke_data[ ][115] = | 3 | 3 | 2 |
| spoke_data[ ][116] = | 3 | 3 | 3 |
| spoke_data[ ][117] = | 3 | 3 | 3 |
| spoke_data[ ][118] = | 3 | 3 | 3 |
| spoke_data[ ][119] = | 3 | 3 | 3 |
| spoke_data[ ][120] = | 3 | 3 | 3 |
| spoke_data[ ][121] = | 3 | 3 | 1 |
| spoke_data[ ][122] = | 3 | 1 | 1 |
| spoke_data[ ][123] = | 1 | 1 | 1 |
| spoke_data[ ][124] = | 1 | 1 | 1 |
| spoke_data[ ][125] = | 1 | 1 | 2 |
| spoke_data[ ][126] = | 1 | 1 | 2 |
| spoke_data[ ][127] = | 2 | 1 | 1 |
| spoke_data[ ][128] = | 1 | 2 | 2 |
| spoke_data[ ][129] = | 1 | 2 | 1 |
| spoke_data[ ][130] = | 2 | 2 | 1 |
| spoke_data[ ][131] = | 2 | 2 | 1 |
| spoke_data[ ][132] = | 2 | 1 | 1 |
| spoke_data[ ][133] = | 1 | 1 | 2 |
| spoke_data[ ][134] = | 2 | 1 | 2 |
| spoke_data[ ][135] = | 1 | 1 | 2 |
| spoke_data[ ][136] = | 2 | 1 | 2 |
| spoke_data[ ][137] = | 1 | 2 | 2 |
| spoke_data[ ][138] = | 1 | 1 | 2 |
| spoke_data[ ][139] = | 1 | 1 | 2 |
| spoke_data[ ][140] = | 2 | 2 | 2 |
| spoke_data[ ][141] = | 3 | 1 | 2 |
| spoke_data[ ][142] = | 3 | 2 | 3 |
| spoke_data[ ][143] = | 3 | 3 | 2 |
| spoke_data[ ][144] = | 3 | 3 | 3 |
| spoke_data[ ][145] = | 2 | 3 | 3 |

-continued

| | spoke_data[0] | spoke_data[1] | spoke_data[2] |
|---|---|---|---|
| spoke_data[ ][146] = | 3 | 3 | 3 |
| spoke_data[ ][147] = | 3 | 3 | 3 |
| spoke_data[ ][148] = | 3 | 3 | 2 |
| spoke_data[ ][149] = | 3 | 3 | 1 |
| spoke_data[ ][150] = | 3 | 3 | 1 |
| spoke_data[ ][151] = | 3 | 3 | 1 |
| spoke_data[ ][152] = | 3 | 3 | 3 |
| spoke data[ ][153] = | 3 | 3 | 3 |
| spoke data[ ][154] = | 3 | 3 | 3 |
| spoke data[ ][155] = | 3 | 3 | 3 |
| spoke_data[ ][156] = | 3 | 3 | 3 |
| spoke data[ ][157] = | 3 | 3 | 2 |
| spoke_data[ ][158] = | 3 | 3 | 1 |
| spoke data[ ][159] = | 4 | 1 | 2 |
| spoke data[ ][160] = | 2 | 1 | 2 |
| spoke_data[ ][161] = | 1 | 1 | 1 |
| spoke data[ ][162] = | 1 | 1 | 1 |
| spoke data[ ][163] = | 1 | 1 | 2 |
| spoke data[ ][164] = | 1 | 1 | 1 |
| spoke data[ ][165] = | 1 | 2 | 1 |
| spoke data[ ][166] = | 2 | 2 | 2 |
| spoke data[ ][167] = | 2 | 2 | 1 |
| spoke data[ ][168] = | 2 | 1 | 1 |
| spoke data[ ][169] = | 2 | 1 | 2 |
| spoke data[ ][170] = | 1 | 1 | 2 |
| spoke data[ ][171] = | 1 | 1 | 1 |
| spoke data[ ][172] = | 1 | 2 | 2 |
| spoke data[ ][173] = | 1 | 1 | 1 |
| spoke data[ ][174] = | 1 | 1 | 2 |
| spoke data[ ][175] = | 2 | 1 | 2 |
| spoke data[ ][176] = | 1 | 1 | 1 |
| spoke data[ ][177] = | 1 | 1 | 2 |
| spoke data[ ][178] = | 3 | 2 | 1 |
| spoke data[ ][179] = | 3 | 3 | 2 |
| spoke data[ ][180] = | 3 | 3 | 3 |
| spoke data[ ][181] = | 3 | 3 | 3 |
| spoke data[ ][182] = | 3 | 3 | 3 |
| spoke data[ ][183] = | 3 | 3 | 3 |
| spoke data[ ][184] = | 3 | 3 | 2 |
| spoke data[ ][185] = | 3 | 3 | 1 |
| spoke data[ ][186] = | 3 | 2 | 1 |
| spoke data[ ][187] = | 3 | 3 | 1 |
| spoke data[ ][188] = | 3 | 3 | 1 |
| spoke data[ ][189] = | 3 | 3 | 3 |
| spoke data[ ][190] = | 3 | 3 | 3 |
| spoke data[ ][191] = | 3 | 3 | 2 |
| spoke data[ ][192] = | 3 | 3 | 3 |
| spoke data[ ][193] = | 3 | 3 | 3 |
| spoke data[ ][194] = | 3 | 3 | 1 |
| spoke data[ ][195] = | 3 | 1 | 1 |
| spoke data[ ][196] = | 1 | 1 | 1 |
| spoke data[ ][197] = | 1 | 1 | 1 |
| spoke data[ ][198] = | 1 | 1 | 2 |
| spoke data[ ][199] = | 1 | 1 | 2 |
| spoke data[ ][200] = | 1 | 1 | 2 |
| spoke data[ ][201] = | 1 | 2 | 1 |
| spoke data[ ][202] = | 1 | 2 | 2 |
| spoke data[ ][203] = | 2 | 2 | 1 |
| spoke_data[ ][204]= | 2 | 2 | 2 |
| spoke_data[ ][205]= | 2 | 1 | 2 |
| spoke_data[ ][206]= | 2 | 2 | 1 |
| spoke_data[ ][207]= | 1 | 1 | 2 |
| spoke_data[ ][208]= | 1 | 2 | 1 |
| spoke_data[ ][209]= | 1 | 1 | 2 |
| spoke_data[ ][210]= | 1 | 1 | 2 |
| spoke_data[ ][211]= | 1 | 2 | 2 |
| spoke_data[ ][212]= | 1 | 1 | 1 |
| spoke_data[ ][213]= | 1 | 1 | 2 |
| spoke_data[ ][214]= | 1 | 1 | 2 |
| spoke_data[ ][215]= | 3 | 3 | 3 |
| spoke_data[ ][216]= | 3 | 3 | 3 |
| spoke_data[ ][217]= | 3 | 3 | 3 |
| spoke_data[ ][218]= | 3 | 3 | 3 |
| spoke_data[ ][219]= | 3 | 3 | 3 |
| spoke_data[ ][220]= | 3 | 2 | 3 |
| spoke_data[ ][221]= | 3 | 3 | 1 |
| spoke_data[ ][222]= | 3 | 2 | 1 |

-continued

|  | spoke_data[0] | spoke_data[1] | spoke_data[2] |
|---|---|---|---|
| spoke_data[ ][223]= | 3 | 3 | 2 |
| spoke_data[ ][224]= | 3 | 3 | 1 |
| spoke_data[ ][225]= | 3 | 3 | 1 |
| spoke_data[ ][226]= | 3 | 3 | 3 |
| spoke_data[ ][227]= | 3 | 3 | 3 |
| spoke_data[ ][228]= | 3 | 3 | 3 |
| spoke_data[ ][229]= | 3 | 3 | 3 |
| spoke_data[ ][230]= | 3 | 3 | 1 |
| spoke_data[ ][231]= | 3 | 3 | 1 |
| spoke_data[ ][232]= | 3 | 1 | 1 |
| spoke_data[ ][233]= | 1 | 1 | 1 |
| spoke_data[ ][234]= | 1 | 1 | 1 |
| spoke_data[ ][235]= | 1 | 1 | 1 |
| spoke_data[ ][236]= | 1 | 1 | 2 |
| spoke_data[ ][237]= | 1 | 2 | 1 |
| spoke_data[ ][238]= | 1 | 2 | 1 |
| spoke_data[ ][239]= | 1 | 2 | 2 |
| spoke_data[ ][240]= | 2 | 2 | 1 |
| spoke_data[ ][241]= | 2 | 2 | 1 |
| spoke_data[ ][242]= | 2 | 1 | 2 |
| spoke_data[ ][243]= | 1 | 1 | 1 |
| spoke_data[ ][244]= | 2 | 2 | 2 |
| spoke_data[ ][245]= | 2 | 1 | 1 |
| spoke_data[ ][246]= | 1 | 1 | 1 |
| spoke_data[ ][247]= | 1 | 1 | 2 |
| spoke_data[ ][248]= | 1 | 1 | 1 |
| spoke_data[ ][249]= | 2 | 1 | 2 |
| spoke_data[ ][250]= | 1 | 1 | 1 |
| spoke_data[ ][251]= | 3 | 1 | 2 |
| spoke_data[ ][252]= | 3 | 3 | 3 |
| spoke_data[ ][253]= | 3 | 3 | 3 |
| spoke_data[ ][254]= | 2 | 3 | 3 |
| spoke_data[ ][255]= | 3 | 3 | 3 |

Studying values by transformation to the frequency domain, as by procedure SpokesFft(int n), it is obtained:

iNumberG[0] = 7   xFirstP[0] = 3
iNumberG[1] = 7   xFirstP[1] = 3
iNumberG[2] = 7   xFirstP[2] = 1

As vector spokes_data[2][256] has enough elements with value equal to 1 (iCountSpaces=103) and equal to 3 or 4 (iCountSpokes=65), it is chosen as vector to be examined.

As number of periodical groups is equal for every vector (iNumberG[2]=iNumberG[1]=iNumberG[0]=7), the values calculated for chosen vector are considered valid:

iNumberGroups=iNumberG[2]=7 xFirstPosition=xFirstP[2]=1

The period length is given from:

$k=256/iNumberGroups=36.6$ $c=36$ $c \bmod 2==0 \rightarrow T=c=36$

Figure 9A:
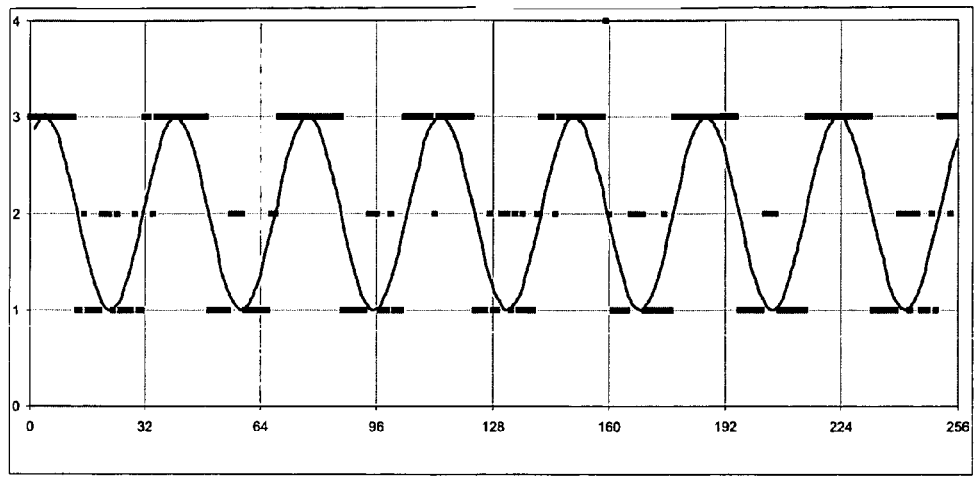
FIG. 9a-9d is illustration for a second detailed working example of the appendix to the description.
Figure 9B:
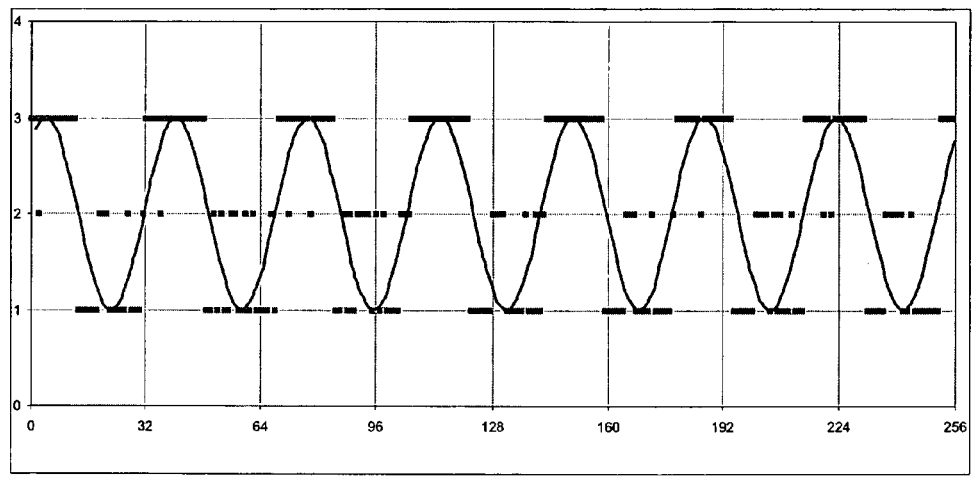
Figure 9C:
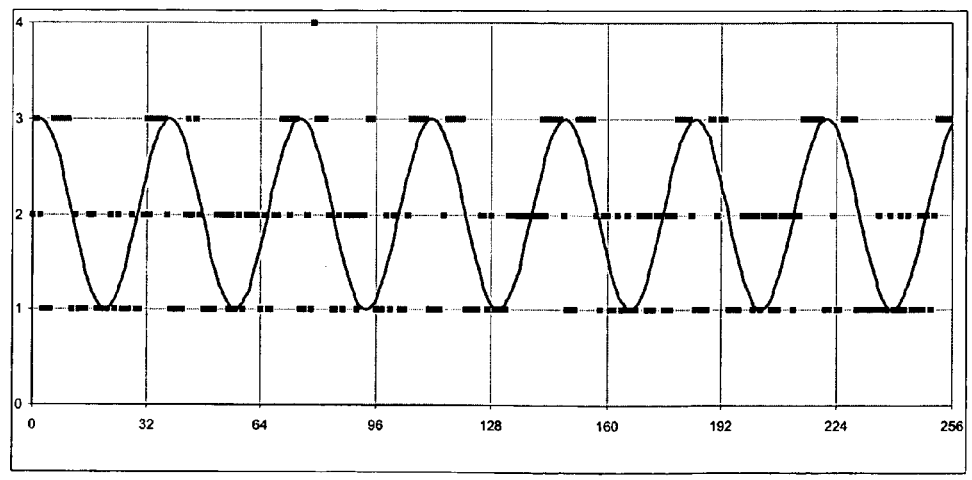
Figure 9D:
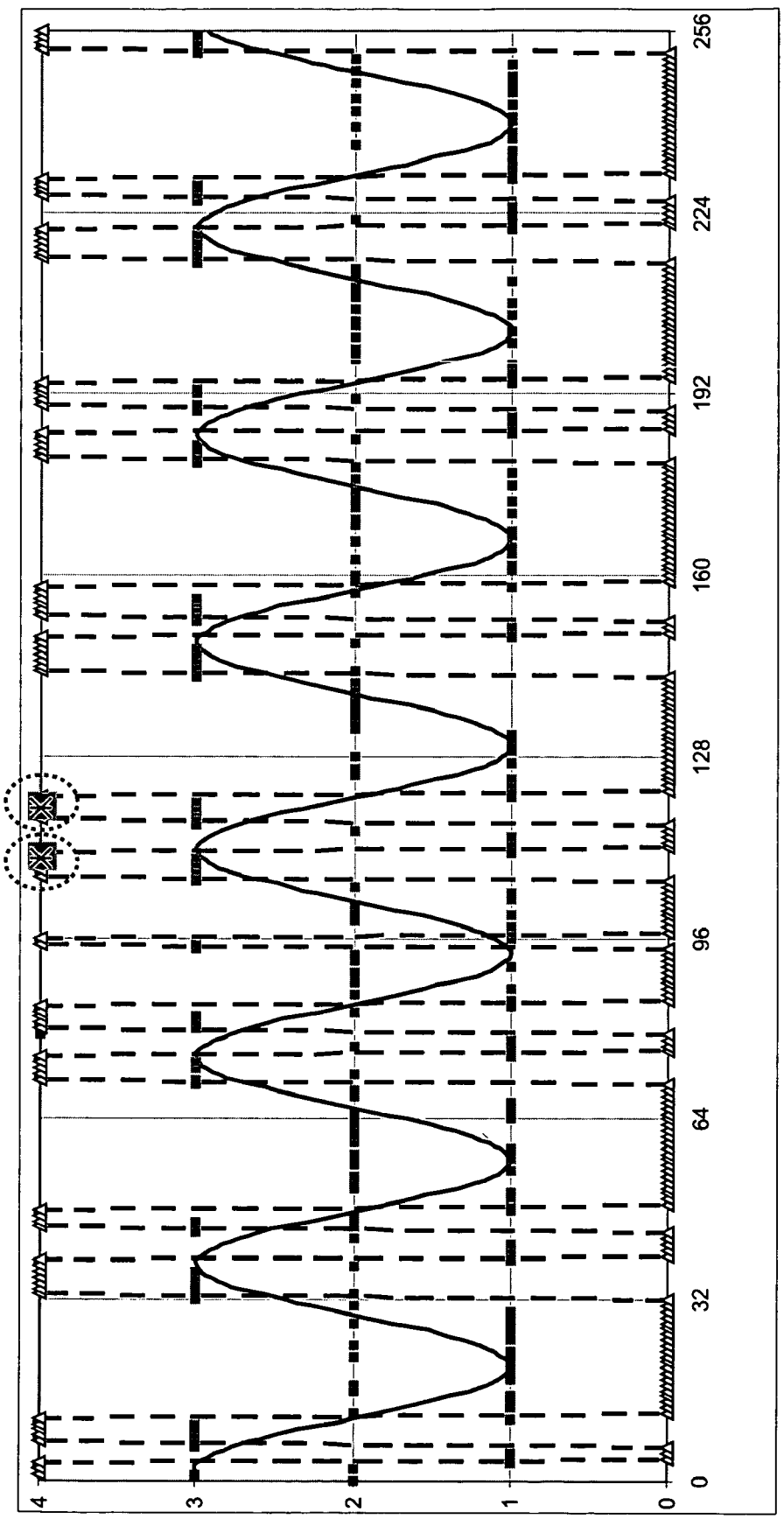

In the FIG. 9a to 9c the vectors spoke_data[0], spoke_data[1], and spoke_data[2] are illustrated. A detailed description of these Figures is omitted for sake of brevity. Again, it is noted that the FIG. 9a to 9d can be interpreted as FIGS. 6a to 7b above.

In the FIG. 9a to 9c it can be observed that at the highest positions only one spoke per group has been detected. However, at the lowest position, the data shows pair of spokes: this is the event of bifurcate spokes. As explained above, a bifurcate spoke splits in two branches in the lower part of the spoke, which is considered as the spoke base at the rim of the wheel.

Now, the periodical groups can be defined as follows:

| Group num 0 | Group num 1 | Group num 2 | Group num 3 |
|---|---|---|---|
| spoke[2][19] = 1 | spoke[2][55] = 1 | spoke[2][91] = 1 | spoke[2][127] = 1 |
| spoke[2][20] = 1 | spoke[2][56] = 2 | spoke[2][92] = 2 | spoke[2][128] = 2 |
| spoke[2][21] = 1 | spoke[2][57] = 1 | spoke[2][93] = 2 | spoke[2][129] = 1 |
| spoke[2][22] = 2 | spoke[2][58] = 2 | spoke[2][94] = 3 | spoke[2][130] = 1 |
| spoke[2][23] = 1 | spoke[2][59] = 1 | spoke[2][95] = 3 | spoke[2][131] = 1 |
| spoke[2][24] = 2 | spoke[2][60] = 2 | spoke[2][96] = 1 | spoke[2][132] = 1 |
| spoke[2][25] = 1 | spoke[2][61] = 2 | spoke[2][97] = 1 | spoke[2][133] = 2 |
| spoke[2][26] = 1 | spoke[2][62] = 2 | spoke[2][98] = 1 | spoke[2][134] = 2 |
| spoke[2][27] = 1 | spoke[2][63] = 2 | spoke[2][99] = 2 | spoke[2][135] = 2 |
| spoke[2][28] = 2 | spoke[2][64] = 1 | spoke[2][100] = 1 | spoke[2][136] = 2 |
| spoke[2][29] = 1 | spoke[2][65] = 2 | spoke[2][101] = 2 | spoke[2][137] = 2 |
| spoke[2][30] = 1 | spoke[2][66] = 1 | spoke[2][102] = 2 | spoke[2][138] = 2 |
| spoke[2][31] = 2 | spoke[2][67] = 1 | spoke[2][103] = 1 | spoke[2][139] = 2 |
| spoke[2][32] = 3 | spoke[2][68] = 2 | spoke[2][104] = 1 | spoke[2][140] = 2 |
| spoke[2][33] = 2 | spoke[2][69] = 2 | spoke[2][105] = 2 | spoke[2][141] = 2 |
| spoke[2][34] = 3 | spoke[2][70] = 3 | spoke[2][106] = 3 | spoke[2][142] = 3 |
| spoke[2][35] = 3 | spoke[2][71] = 3 | spoke[2][107] = 3 | spoke[2][143] = 2 |
| spoke[2][36] = 3 | spoke[2][72] = 2 | spoke[2][108] = 3 | spoke[2][144] = 3 |
| spoke[2][37] = 3 | spoke[2][73] = 3 | spoke[2][109] = 3 | spoke[2][145] = 3 |
| spoke[2][38] = 2 | spoke[2][74] = 3 | spoke[2][110] = 3 | spoke[2][146] = 3 |
| spoke[2][39] = 1 | spoke[2][75] = 1 | spoke[2][111] = 1 | spoke[2][147] = 3 |
| spoke[2][40] = 1 | spoke[2][76] = 1 | spoke[2][112] = 1 | spoke[2][148] = 2 |
| spoke[2][41] = 1 | spoke[2][77] = 2 | spoke[2][113] = 1 | spoke[2][149] = 1 |
| spoke[2][42] = 1 | spoke[2][78] = 1 | spoke[2][114] = 1 | spoke[2][150] = 1 |
| spoke[2][43] = 2 | spoke[2][79] = 4 | spoke[2][115] = 2 | spoke[2][151] = 1 |
| spoke[2][44] = 3 | spoke[2][80] = 3 | spoke[2][116] = 3 | spoke[2][152] = 3 |
| spoke[2][45] = 2 | spoke[2][81] = 3 | spoke[2][117] = 3 | spoke[2][153] = 3 |
| spoke[2][46] = 3 | spoke[2][82] = 3 | spoke[2][118] = 3 | spoke[2][154] = 3 |
| spoke[2][47] = 2 | spoke[2][83] = 2 | spoke[2][119] = 3 | spoke[2][155] = 3 |
| spoke[2][48] = 1 | spoke[2][84] = 1 | spoke[2][120] = 3 | spoke[2][156] = 3 |
| spoke[2][49] = 1 | spoke[2][85] = 1 | spoke[2][121] = 1 | spoke[2][157] = 2 |
| spoke[2][50] = 1 | spoke[2][86] = 2 | spoke[2][122] = 1 | spoke[2][158] = 1 |

-continued

| | | | |
|---|---|---|---|
| spoke[2][51] = 1 | spoke[2][87] = 1 | spoke[2][123]= 1 | spoke[2][159] = 2 |
| spoke[2][52] = 2 | spoke[2][88] = 2 | spoke[2][124] = 1 | spoke[2][160] = 2 |
| spoke[2][53] = 2 | spoke[2][89] = 2 | spoke[2][125] = 2 | spoke[2][161] = 1 |
| spoke[2][54] = 2 | spoke[2][90] = 2 | spoke[2][126] = 2 | spoke[2][162] = 1 |

| Group num 4 | Group num 5 | Group num 6 |
|---|---|---|
| spoke[2][163] = 2 | spoke[2][199] = 2 | spoke[2][235] = 1 |
| spoke[2][164] = 1 | spoke[2][200] = 2 | spoke[2][236] = 2 |
| spoke[2][165] = 1 | spoke[2][201] = 1 | spoke[2][237] = 1 |
| spoke[2][166] = 2 | spoke[2][202] = 2 | spoke[2][238] = 1 |
| spoke[2][167] = 1 | spoke[2][203] = 1 | spoke[2][239] = 2 |
| spoke[2][168] = 1 | spoke[2][204] = 2 | spoke[2][240] = 1 |
| spoke[2][169] = 2 | spoke[2][205] = 2 | spoke[2][241] = 1 |
| spoke[2][170] = 2 | spoke[2][206] = 1 | spoke[2][242] = 2 |
| spoke[2][171] = 1 | spoke[2][207] = 2 | spoke[2][243] = 1 |
| spoke[2][172] = 2 | spoke[2][208] = 1 | spoke[2][244] = 2 |
| spoke[2][173] = 1 | spoke[2][209] = 2 | spoke[2][245] = 1 |
| spoke[2][174] = 2 | spoke[2][210] = 2 | spoke[2][246] = 1 |
| spoke[2][175] = 2 | spoke[2][211] = 2 | spoke[2][247] = 2 |
| spoke[2][176] = 1 | spoke[2][212] = 1 | spoke[2][248] = 1 |
| spoke[2][177] = 2 | spoke[2][213] = 2 | spoke[2][249] = 2 |
| spoke[2][178] = 1 | spoke[2][214] = 2 | spoke[2][250] = 1 |
| spoke[2][179] = 2 | spoke[2][215] = 3 | spoke[2][251] = 2 |
| spoke[2][180] = 3 | spoke[2][216] = 3 | spoke[2][252] = 3 |
| spoke[2][181] = 3 | spoke[2][217] = 3 | spoke[2][253] = 3 |
| spoke[2][182] = 3 | spoke[2][218] = 3 | spoke[2][254] = 3 |
| spoke[2][183] = 3 | spoke[2][219] = 3 | spoke[2][255] = 3 |
| spoke[2][184] = 2 | spoke[2][220] = 3 | spoke[2][0] = 2 |
| spoke[2][185] = 1 | spoke[2][221] = 1 | spoke[2][1] = 3 |
| spoke[2][186] = 1 | spoke[2][222] = 1 | spoke[2][2] = 2 |
| spoke[2][187] = 1 | spoke[2][223] = 2 | spoke[2][3] = 1 |
| spoke[2][188] = 1 | spoke[2][224] = 1 | spoke[2][4] = 1 |
| spoke[2][189] = 3 | spoke[2][225] = 1 | spoke[2][5] = 1 |
| spoke[2][190] = 3 | spoke[2][226] = 3 | spoke[2][6] = 3 |
| spoke[2][191] = 2 | spoke[2][227] = 3 | spoke[2][7] = 3 |
| spoke[2][192] = 3 | spoke[2][228] = 3 | spoke[2][8] = 3 |
| spoke[2][193] = 3 | spoke[2][229] = 3 | spoke[2][9] = 3 |
| spoke[2][194] = 1 | spoke[2][230] = 1 | spoke[2][10] = 3 |
| spoke[2][195] = 1 | spoke[2][231] = 1 | spoke[2][11] = 1 |
| spoke[2][196] = 1 | spoke[2][232] = 1 | spoke[2][12] = 2 |
| spoke[2][197] = 1 | spoke[2][233] = 1 | spoke[2][13] = 1 |
| spoke[2][198] = 2 | spoke[2][234] = 1 | spoke[2][14] = 1 |

Then the elements El0, El1, . . . , El6 of periodical groups are defined as follows:

| | Group num 0 | Group num 1 | Group num 2 | Group num 3 |
|---|---|---|---|---|
| E10 | space long 13 | space long 15 | space long 3 | space long 15 |
| E11 | spoke long 7 | spoke long 5 | spoke long 2 | spoke long 7 |
| E12 | space long 5 | space long 4 | space long 10 | space long 3 |
| E13 | spoke long 4 | spoke long 5 | spoke long 5 | spoke long 6 |
| E14 | space long 7 | space long 7 | space long 5 | space long 5 |
| E15 | | | spoke long 5 | |
| E16 | | | space long 6 | |

| | Group num 4 | Group num 5 | Group num 6 |
|---|---|---|---|
| E10 | space long 17 | space long 16 | space long 17 |
| E11 | spoke long 5 | spoke long 6 | spoke long 7 |
| E12 | spare long 4 | space long 5 | space long 3 |
| E13 | spoke long 5 | spoke long 4 | spoke long 5 |
| E14 | space long 5 | space long 5 | space long 4 |
| E15 | | | |
| E16 | | | |

The periodical group number 2 shows an anomaly compared with the other groups. It looks like that the scanner detects one more spoke in this group. However, this "short spoke" corresponds to the valve in the rim. By comparing the groups, the algorithm can detect the anomaly and modifies the group's elements, absorbing the valve in the nearby spaces.

Accordingly, element number 0 is a space, which is 15 long; element number 1 is a spoke, which is 5 long; element number 2 is a space, which is 5 long, element number 3 is a spoke, which is 5 long; and element number 4 is a space, which is 6 long.

Next, the mean spokes width is calculated and considered to be enough to go on:

iCount=14 iCount/2=7 dMean=(7+4+5+5+5+5+7+6+5+5+6+4+7+5)/14=76/14=5.4 iGroupCount=12

For the further example scenario it is assumed that the unbalance found on wheel should be corrected placing a balancing weight on position represented by index 117, with reference to rim mapping in 256 steps. From procedure PreHSP(int iWeightPosition) it is so obtained: iWeightGroup=2, that is the periodical group, where weight should be placed is number 2; iWeightPosGroup=26, that is the weight should be placed in the position 26 of the periodical group; iWeightElement=3, that is the weight should be placed in the element number 3 of the periodical group; and iWeightPosElement=1, that is the weight should be placed in the second position of the element number 3 of the periodical group.

As to the periodical group 2, where weight should be placed: element number 0 is a space being 15 long; element number 1 is a spoke being 5 long; element number 2 is a space being 5 long; element number 3 is a spoke being 5 long; and element number 4 is a space being 6 long.

As to the previous periodical group 1: element number 0 is a space being 15 long; element number 1 is spoke being 5 long; Element number 2 is space being 4 long; Element number 3 is spoke being 5 long; and Element number 4 is space being 7 long.

Next periodical group is 3: element number 0 is space being 15 long; element number 1 is spoke being 7 long; element number 2 is space being 3 long; element number 3 is spoke being 6 long; and element number 4=space long 5.

To sum it up, the optimal position for placement of the balancing weight has been identified by rElement[iWeightGroup][iWeightElement].bSpoke=true and rElement[iWeightGroup][iWeightElement].iWidth=5, that is the weight should be placed behind a spoke being 5 long.

The suitable position before the calculated one matches with the first branch of spoke of the given periodical group: rElement[iWeightGroup][iPrevElement].bSpoke=true and rElement[iWeightGroup][iPrevElement].iWidth=5.

The suitable position after the calculated one matches with the second branch of spoke of given periodical group, behind which the weight not split should be anyway placed: rElement[iWeightGroup][iPostElement].bSpoke=true and rElement[iWeightGroup][iPostElement].iWidth=5.

The respective index related to the rim of the wheel which is mapped into 256 steps is iIndexPrev=109 and iIndexPost=118. The balancing weight has to be split in two weights to place behind branches of spokes given by index 109 and index 118.

CONCLUSIONS FROM THE DISCUSSION ABOVE AND EXAMPLE 1 AND 2

The presented method for the improved hidden spokes placement (HSP) of balancing weights on a wheel, having a hub, a rim and the hub and the rim being connected by several spokes, comprises determination of spoke configuration data. Now, it is possible to analyze the spoke configuration and the width of the spokes in detail, enabling balancing weight splitting behind spokes even if spokes are forked, oblique, not equidistant, or they have different dimension, as illustrated in FIG. 2a to 2g.

The invention claimed is:

1. A method for hidden spokes placement of balancing weights on a wheel, having a hub, a rim and the hub and the rim being connected by several spokes, the method comprising determination of spoke configuration data by steps of:
    sampling of spokes data at a sampling position being at fixed distance from the rim;
    transforming, using a computer, the sampled spokes data from spatial domain into frequency domain for providing frequency characteristics of the spokes data;
    deriving the spoke configuration data from the frequency characteristics of the spokes data;
    determining an optimal value of a balancing weight for the wheel; and
    determining an optimal position of the balancing weight for the wheel based on the spoke configuration data.

2. The method according to claim 1, wherein the sampling step is performed in several different positions each with a predetermined distance relative to the bead of the rim.

3. The method according to claim 1 or 2, wherein the sampling step further comprises evaluating each data point of the sampled spokes data by assigning a predetermined value representing one of a predetermined condition.

4. The method according to claim 1 or 2, wherein the sampling step comprises revolving of the wheel for several revolutions in the sampling position and wherein in each revolution the sampled spokes data is further completed where reliable sample values are still missing.

5. The method according to claim 1 or 2, wherein transforming step comprises performing a Fourier Transform on the spokes data providing Fourier data of the spokes data.

6. The method according to claim 5, wherein the deriving step comprises identifying periodical patterns corresponding to spoke groups by a harmonic frequency information of the Fourier data having highest amplitude and position of the periodical groups by a phase information of the harmonic frequency.

7. The method according to claim 6, further comprising a step of deducting positions of spokes and deriving respective spoke widths in the identified periodical patterns and generating a spoke configuration map representing the spoke configuration data of the wheel.

8. The method according to claim 1 or 2, further comprising a step of comparing the optimal position of the balancing weight and the spoke configuration data to determine whether the optimal position of the balancing weight already matches with a position of a spoke.

9. The method according to claim 8, further comprising a step of determining first and second spokes in the spoke configuration data adjacent to the optimal position of the balancing weight, if the outcome of the comparing step is such that the determined optimal position of the balancing weight is not or partially not behind a spoke.

10. The method according to claim 9, further comprising a splitting step with calculating first and second split values of first and second split balancing weights based on the determined value and position of the optimal balancing weight and the positions of the first spoke and the second spoke.

11. The method according to claim 10, wherein the splitting step is iterated until a predetermined dimension for a split balancing weight is reached or until a determined dimension for a split balancing weight is smaller than a width of a respective determined spoke according to the spoke configuration data.

12. The method according to claim 11, wherein iteration of the splitting step comprises the step of setting at least one of the determined positions of the first spoke and the second spoke with the respective calculated value for the split balancing weight as respective new starting conditions for a next splitting step.

13. A computer program product comprising code means stored on a data storage means for carrying out a method for hidden spokes placement of balancing weights on a wheel, having a hub, a rim and the hub and the rim being connected by several spokes, the code means when executed on a computer controlling a wheel balancing apparatus causes the computer to carry out steps of:
    sampling of spokes data at a sampling position being at fixed distance from the rim;
    transforming the sampled spokes data from spatial domain into frequency domain for providing frequency characteristics of the spokes data;
    deriving spoke configuration data from the frequency characteristics of the spokes data;
    determining an optimal value of a balancing weight for the wheel; and
    determining an optimal position of the balancing weight for the wheel based on the spoke configuration data.

14. A data storage means for storing a computer program product comprising code means for carrying out a method for hidden spokes placement of balancing weights on a wheel, having a hub, a rim and the hub and the rim being connected by several spokes, the code means when executed by a computer causing the computer to carry out steps of:

sampling of spokes data at a sampling position being at fixed distance from the rim;

transforming the sampled spokes data from spatial domain into frequency domain for providing frequency characteristics of the spokes data;

deriving spoke configuration data from the frequency characteristics of the spokes data;

determining an optimal value of a balancing weight for the wheel; and determining an optimal position of the balancing weight for the wheel based on the spoke configuration data.

15. An apparatus for placing a balancing weight behind spokes of a wheel to be balanced, the apparatus comprising:

a measurement shaft attached to a balancing machine;

mounting means for mounting the vehicle wheel to the shaft for rotation about a wheel axis;

a light source operable to direct an emitted light beam onto a location on the vehicle wheel;

a light-sensitive receiver operable to receive a beam reflected by the sensed location on the vehicle wheel;

means for moving the light source and the receiver synchronously;

means for storing spoke measurement values of the position sensitive receiver;

transformation means for performing a transformation on the stored spoke measurement values from spatial domain into frequency domain;

an electronic evaluation system configured to evaluate the transformed spokes data, to generate spoke configuration data representing the positions and characteristics of the spokes and the spaces between consecutive spokes of the wheel; and a force measuring device operable to supply signals proportional to an unbalance of the vehicle wheel to the evaluation system configured for determining an optimal value and an optimal position of a balancing weight for the vehicle wheel as values for balancing the vehicle wheel;

wherein the evaluation system is further configured to evaluate the values for balancing the vehicle wheel and the values of the spoke configuration data for providing positions for balancing weights, which are on the rim behind a spoke of the wheel.

16. The apparatus according to claim 15, wherein the light source and the receiver are synchronously moveable for scanning spokes data in several predetermined positions.

17. Apparatus according to claim 15, wherein the transformation means is a processing unit configured to perform a Fourier Transform.

18. The apparatus according to claim 15, wherein the transformation means are a digital signal processor configured to perform a Fast Fourier Transform.

\* \* \* \* \*